(12) United States Patent
Lee

(10) Patent No.: US 10,754,175 B2
(45) Date of Patent: Aug. 25, 2020

(54) HEAD-MOUNTED DISPLAY

(71) Applicant: LG ELECTRONICS INC., Seoul (KR)

(72) Inventor: Minjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 16/071,001

(22) PCT Filed: Feb. 18, 2016

(86) PCT No.: PCT/KR2016/001641
§ 371 (c)(1),
(2) Date: Jul. 18, 2018

(87) PCT Pub. No.: WO2017/142108
PCT Pub. Date: Aug. 24, 2017

(65) Prior Publication Data
US 2019/0056601 A1 Feb. 21, 2019

(51) Int. Cl.
*G02C 5/14* (2006.01)
*G02B 27/01* (2006.01)
*G02C 11/00* (2006.01)
*H02K 7/14* (2006.01)

(52) U.S. Cl.
CPC ............. *G02C 5/143* (2013.01); *G02B 27/01* (2013.01); *G02C 11/10* (2013.01); *H02K 7/14* (2013.01)

(58) Field of Classification Search
CPC ........ G02C 5/143; G02C 11/10; G02B 27/01; G02B 27/0176; G02B 27/017; G02B 2027/014; G02B 2027/0178; H02K 7/14

USPC ........................................... 351/41, 111, 123
See application file for complete search history.

(56) References Cited

U.S. PATENT DOCUMENTS

| 10,379,877 B2* | 8/2019 | Ko ................... G06F 9/44505 |
| 2010/0283959 A1* | 11/2010 | Miyashita ............ G02C 3/003 |
| | | 351/123 |
| 2014/0231474 A1 | 8/2014 | Sugihara et al. |
| 2017/0112438 A1* | 4/2017 | Min .................... A61B 5/0402 |

FOREIGN PATENT DOCUMENTS

| JP | 2009-3335 A | 1/2009 |
| KR | 10-2015-0034895 A | 4/2015 |
| KR | 10-2015-0109971 A | 10/2015 |
| KR | 10-2016-0002190 A | 1/2016 |

* cited by examiner

*Primary Examiner* — Tuyen Tra
(74) *Attorney, Agent, or Firm* — Birch, Stewart, Kolasch & Birch, LLP

(57) ABSTRACT

The present invention comprises: a display module; a case in which the display module is installed; one pair of support legs connected to the case and supported by the head of a wearer; a motion sensor for sensing the motion of the head of the wearer; a load adjuster for adjusting a load to be applied from the support legs to the head of the wearer; and a control unit for controlling the load adjuster according to a sensing result of the motion sensor, thereby reducing a load to be applied to the head of the wearer during a static wearing so as to provide comfort to the wearer and increasing a load to be applied to the head of the wearer during a dynamic wearing so as to minimize shaking.

15 Claims, 23 Drawing Sheets

HEAD-MOUNTED DISPLAY

CROSS REFERENCE TO RELATED APPLICATIONS

This application is the National Phase of PCT International Application No. PCT/KR2016/001641, filed on Feb. 18, 2016, all of which are hereby expressly incorporated by reference into the present application.

TECHNICAL FIELD

The present invention relates to a head-mounted display and, more particularly, to a head-mounted display having support legs supported on a wearer's head.

BACKGROUND ART

A head-mounted display (HMD) is a display device worn on a head. The head-mounted display causes a wearer to feel as if the wearer views a huge screen through a screen located in front of wearer's eyes and may be used as a virtual reality device or smart glasses.

The head-mounted display includes a glasses-type head-mounted display and a helmet-type head-mounted display according to the wearing method thereof.

In addition, the head-mounted display may be divided into a non-transmission-type head-mounted display in which wearer's visibility is blocked in a state that a wearer wears the head-mounted display and a transmission-type head-mounted display in which wearer's visibility is not blocked in a state that a wearer wears the head-mounted display.

The head-mounted display may recognize motion of the wearer through a sensor and control a screen according to motion of the wearer. For example, when the wearer turns his/her head to the left, a scene displayed on the screen may also be moved to the left and content on the display may be manipulated in consideration of movement of the head of the wearer.

The head-mounted display may include a display unit for providing an image and support legs to be worn on the wearer's head. When head-mounted display is worn, the head-mounted display may be tilted forward by the weight of the display unit.

In the head-mounted display according to the related art, when the user who wears the head-mounted display takes large action such as inclining of a head or jumping, the head-mounted display is not firmly supported and is excessively shaken. Therefore, the head-mounted display may be easily separated from the wearer's head during large action.

DISCLOSURE

Technical Problem

An object of the present disclosure is to provide a head-mounted display which may be stably supported on a wearer's head and may improve wearing comfort.

Technical Solution

According to an embodiment of the present invention, a head-mounted display includes a display module, a case in which the display module is installed, a pair of support legs connected to the case and supported on a wearer's head, a motion sensor for sensing motion of the wearer's head, a load adjuster for adjusting a load applied from each of the support legs to the wearer's head, and a controller for controlling the load adjuster according to a sensed result of the motion sensor.

The motion sensor may include an acceleration sensor and a gyro sensor installed in any one of the display mode, the case and the support legs.

The load adjuster may include a cushion installed in each of the support legs to face the wearer's head and a cushion advance/retreat mechanism controlled by the controller to enable the cushion to advance toward the wearer's head or to enable the cushion to retreat toward the support leg.

The cushion advance/retreat mechanism may include a motor installed in each of the support legs and having a motor shaft connected to the cushion.

The motor may be a linear motor for enabling the motor shaft to advance and retreat.

The motor shaft may be disposed orthogonally to a longitudinal direction of each of the support legs.

The cushion advance/retreat mechanism may include a motor installed in each of the support legs and having a motor shaft and a cushion contact member connected to the motor shaft and disposed to be brought into contact with the cushion.

The cushion contact member may include a cam located between each of the support legs and the cushion.

The cushion advance/retreat mechanism may include an airbag inflated or contracted by air to enable the cushion to advance and retreat and an air regulator for regulating air of the airbag.

Each of the pair of the support leg may include a curved part curved backward along the wearer's head.

The cushion may be installed on the curved part.

The load adjuster may include a motor installed in the case and controlled by the controller, and the motor may include a support leg rotation shaft connected to each of the support legs to rotate each of the support legs.

The load adjuster may include an actuator installed in any one of each of the support legs and the case and controlled by the controller, and the actuator may have a push load moved to press the other of each of the support legs and the case to rotate each of the support legs in a head direction of the wearer.

The head-mounted display may further include a nose pad installed in the case and seated on a nose of the wearer and a pair of side pads connected to the support legs.

Each of the pair of side pads may include a support leg connector slidably connected to each of the support legs in a longitudinal direction of the support leg, a seating pad; and a supporter connecting the support leg connector with the seating pad.

The supporter may be inclined from the support leg connector to a cheekbone portion of the wearer.

The seating pad may be inclined in a tangential direction of an outer surface of a cheekbone portion of the wearer.

Each of the support legs may include a connection leg connected to the case and a moving leg disposed on the connection leg to be moved backward, and the load adjuster may include an actuator installed in any one of the connection leg and the moving leg and controlled by the controller and a moving load connected to the other of the connection leg and the moving leg and the actuator to enable the moving leg to advance and retreat upon driving the actuator.

Advantageous Effects

According to embodiments of the present invention, it is possible to provide comfort to a wearer by reducing a load applied to a wearer's head upon static wearing and to prevent the head-mounted display from being arbitrarily separated while minimizing shaking by increasing the load applied to the wearer's head upon dynamic wearing.

In addition, a plurality of wearers having different head sizes can wear the head-mounted display with high stability.

In addition, the load of the head-mounted display can be distributed to a curved part and a side pad, the head-mounted display can be more comfortably worn than that the case where the load of the head-mounted display is concentrated on a nose pad, and skin pain or congestion caused when the load of the head-mounted display is concentrated on the nose pad can be minimized.

BEST MODE

Hereinafter, the embodiments of the present invention will be described in detail with reference to the drawings.

Figure 1:
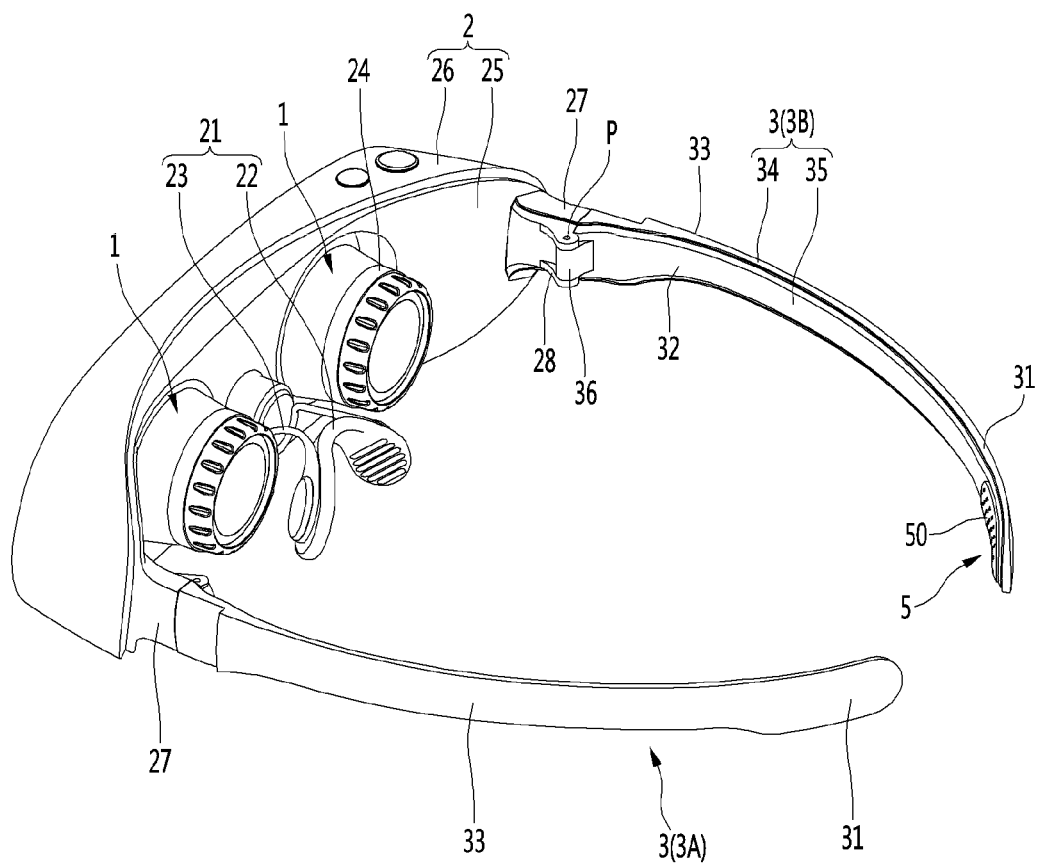
FIG. 1 is a perspective view showing a head-mounted display according to a first embodiment of the present invention.
Figure 2:
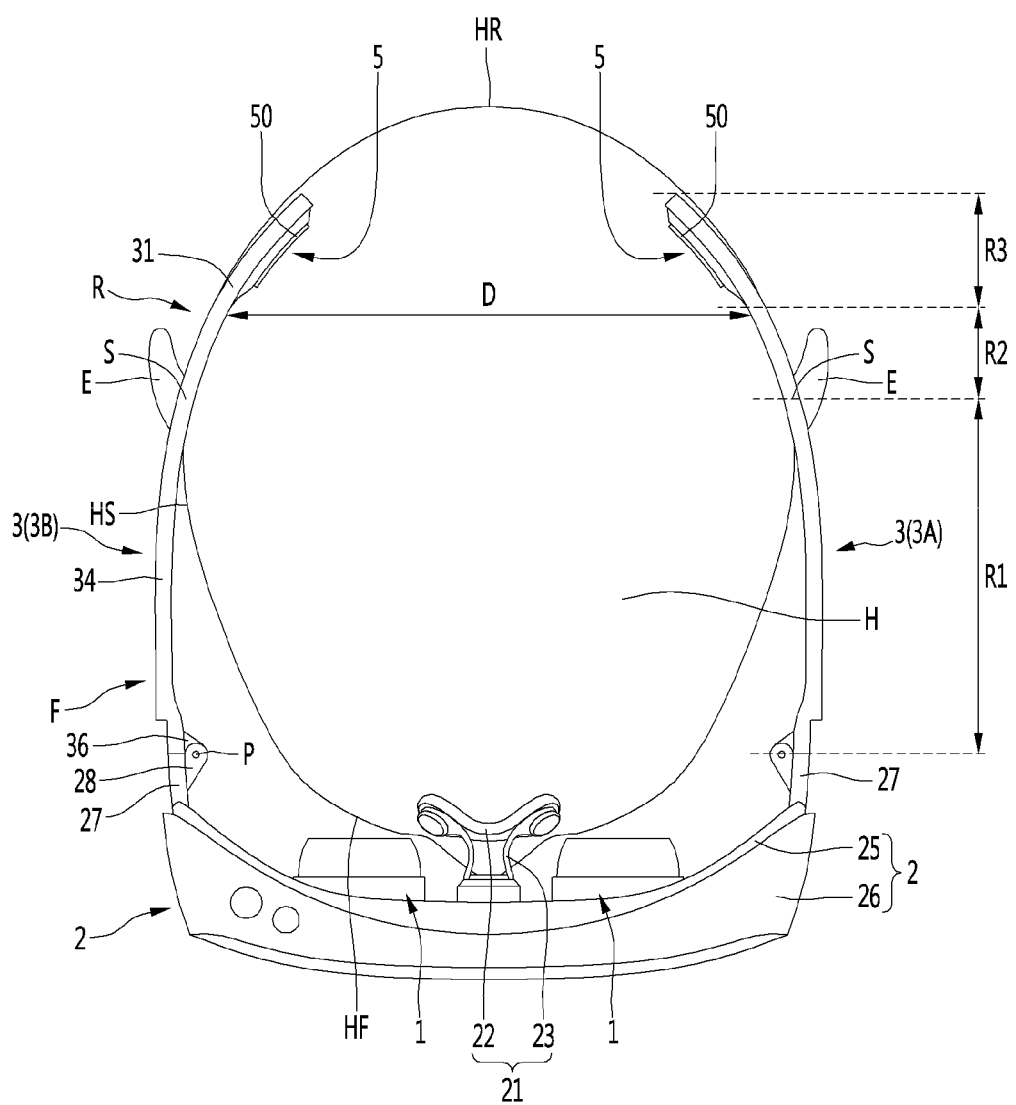
FIG. 2 is a plan view showing the head-mounted display according to the first embodiment of the present invention.
Figure 3:
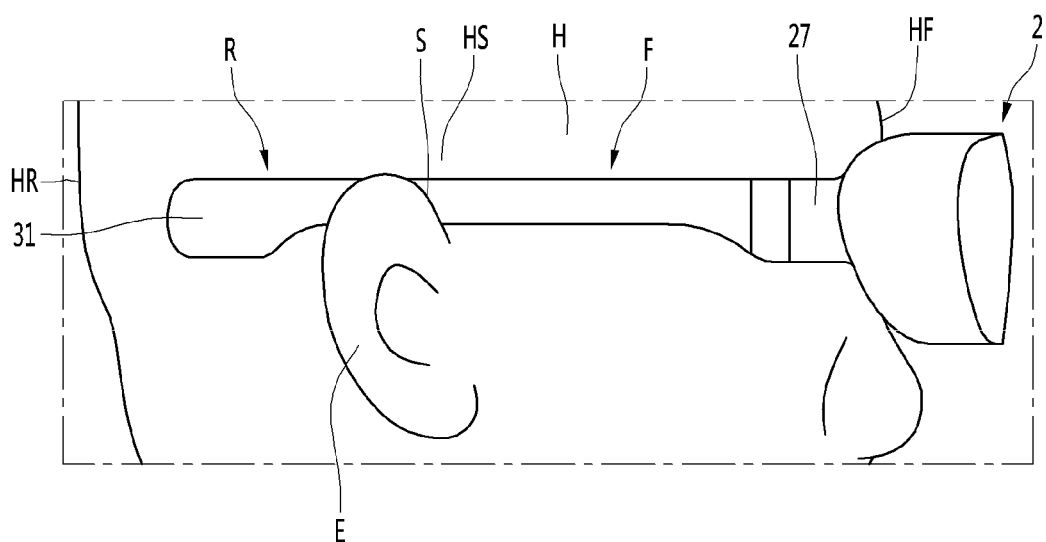
FIG. 3 is a side view showing the head-mounted display according to the first embodiment of the present invention.

FIG. 1 is a perspective view showing a head-mounted display according to a first embodiment of the present invention, FIG. 2 is a plan view showing the head-mounted display according to the first embodiment of the present invention, and FIG. 3 is a side view showing the head-mounted display according to the first embodiment of the present invention.

The head-mounted display includes a display module 1, a case 2 in which the display module 1 is installed, a pair of support legs 3 connected to the case 2 and supported on a wearer's head H, and a load adjuster 5 for adjusting a load applied to the wearer's head H.

The display module 1 may display a virtual reality image in a state of being installed in the case 2. One or a plurality of display modules 1 may be provided in the case 2. The display module 1 may be installed to face the wearer's eyes and a pair of display modules may be installed.

The display module 1 may include a lens 11. The lens 11 may be installed to face the wearer's eyes. The display module 1 may include a display unit for displaying an image. The wearer may view the image of the display unit through the lens 11.

The display unit may include at least one of a liquid crystal display (LCD), a thin film transistor-liquid crystal display (TFT LCD), an organic light-emitting diode (OLED), a flexible display, a three-dimensional (3D) display, and an e-ink display.

The case 2 may support the display module 1. The case 2 may form the appearance of the head-mounted display. The case 2 may be configured by a combination of a plurality of members.

The case 2 may include a nose piece 21 seated on a wearer's nose. The nose piece 21 may be integrally formed in the case 2 and may include a nose pad 22 formed of a material such as rubber. In the nose piece 21, the nose pad 22 may be directly connected to the case 2. The nose piece 21 may further include the nose pad 22 and a nose pad connector 23 for connecting the nose pad 22 to the case 2.

The case 2 may include a main body 25, in which a display module mounting hole 24 is formed, and a front body 26 coupled to a front side of the main body 24.

Support leg connectors 27 for connecting the support legs may protrude from the case 2. The support leg connectors 27 may protrude from the case 2 backward. A pair of left and right support leg connectors 27 may be provided to connect the pair of support legs. The support leg connectors 27 may protrude from the main body 24 backward.

The pair of support legs 3 may be hinged to the case 2. The pair of support legs 3 may be symmetrically connected to the case 2. The pair of support legs 3 may include a left support leg 3A connected to the left side of the case 2 and extending from the left side of the case 2 backward and a right support leg 3B connected to the right side of the case 2 and extending from the right side of the case 2 backward. The left support leg 3A may be connected to the support leg connectors 27 provided at the left side of the case 2. The right support leg 3B may be connected to the support leg connectors 27 provided at the right side of the case 2.

The left support leg 3A and the right support leg 3B may be laterally symmetrical and the positions thereof may be different. Hereinafter, the support leg 3 will be described with respect to the common configuration of the left support leg 3A and the right support leg 3B, and the left support leg 3A and the right support leg 3B will be described with respect to the different configuration of the left support leg 3A and the right support leg 3B.

As shown in FIGS. 1 and 2, the pair of support legs 3 may be unfolded backward to be worn on the wearer's head H and may be folded when storing or moving the head-mounted display. The pair of support legs 3 may be placed and supported on the wearer's ears E and/or may be supported in close contact with the wearer's ears E while being seated on the wearer's ears.

One surface of each of the pair of support legs 3 may be an inner side surface 32 facing the wearer's head H when the head-mounted display is worn. The opposite surface of the inner side surface 32 of each of the pair of support legs 3 may be an outer side surface 33.

Parts of the inner side surfaces 32 of the pair of support legs 3 may be brought into contact with the side surfaces HS of the wearer's head. Parts S, which are placed on the wearer's ears, of the pair of support legs 3 may be brought into contact with the side surfaces HS of the wearer's head. The pair of support legs 3 may be divided into a front part F and a rear part R based on the parts S, which are placed on the wearer's ears E.

Each of the pair of support legs 3 may include a streamline structure surrounding the wearer's head H from the side surface to the back side thereof. Each of the pair of support legs 3 may include a curved part 31 in which a distance D between the support legs is reduced backward when the pair of the support legs is unfolded. The curved part 31 may be curved backward along the wearer's head H. The curved part 31 may be curved along the wearer's head. The curved part 31 may be formed in the rear part R of each of the pair of support legs 3. At least a portion of the curved part 31 may be located at the back side of the wearer's ear E, as shown in FIG. 2, when the head-mounted display is worn on the wearer's head H. The curved part 31 may be curved along the rear part of the wearer's ear E of the wearer's head while extending to the back surface of the wearer's head H.

The curved part 31 may coincide with the rear part R of the support leg 3. The curved part 31 may include a portion of the front part F and the whole of the rear part R or may be a portion of the rear part R according to the size of the wearer's head or the position of the wearer's ear.

The sizes of the wearer's heads may differ, and thus the head-mounted display may be configured such that a wearer having a large head size wears the head-mounted display without discomfort. When the curved part 31 is brought into contact with the wearer's head H to press the wearer's head H, the head-mounted display may be configured such that pressing force caused by the curved part 31 is prevented from being excessively applied.

As shown in FIG. 2, the pair of support legs 3 may be configured such that rigidities of several parts R1, R2 and R3 of the support leg 3 are different, thereby suiting the shape of the head. The support leg 3 may be configured such that rigidity of a part located behind the ear E is lower than that of a part of the support leg 3 located in front of the ear E based on a front end thereof. The support leg 3 may include two parts having different rigidities between a part placed on the ear E and the rear end of the support leg 3.

The support leg 3 may have a high-rigidity part R1 having first rigidity from the front end to a part located at the ear E, a middle-rigidity part R2 having second rigidity lower than the first rigidity from the part S located at the ear E to a predetermined distance from the rear end of the support leg 3, and a low-rigidity part R3 having third rigidity lower than the second rigidity from the middle-rigidity part R2 to the rear end of the support leg 3. In the support leg 3, at least one of the materials and thicknesses of the high-rigidity part R1, the middle-rigidity part R2 and the low-rigidity part R3 may be differently set. A sum of the length of the low-rigidity part R3 and the length of the middle-rigidity part R2 may be less than the length of the high-rigidity part R1.

The support leg 3 may be configured such that the rigidities of the materials of the high-rigidity part R1, the middle-rigidity part R2 and the low-rigidity part R3 are gradually decreased from the front end to the rear end. The support leg 3 may be configured such that the thicknesses of the high-rigidity part R1, the middle-rigidity part R2 and the low-rigidity part R3 are gradually decreased from the front end to the rear end.

Meanwhile, each of the pair of support legs 3 may include an outer body 34 having an outer side surface 33 and an inner body 35 coupled to the outer body 34 and having an inner side surface 32 facing the wearer's head.

The pair of support legs 3 may be connected to the case 2 to be rotated about a hinge shaft P. A hinge shaft support part 28 rotatably supporting the hinge shaft P may be formed on any one of the case 2 and the support leg 3. A hinge shaft connector 36 connecting the hinge shaft P may be formed on the other of the case 2 and the support leg 3. The hinge shaft P may be rotated integrally with the hinge shaft connector 36.

The load adjuster 5 may include a cushion 50 installed on the support leg 3 to face the wearer's head H. The load adjuster 5 may change the load applied from the cushion 50 to the wearer's head H.

The position where the wearer's head H is pressed may be changed according to the mounting position of the cushion 50. As shown in FIG. 2, the cushion 50 may be installed to be located behind the wearer's ear E. The cushion 50 may be provided in the rear part R between the front part F and the rear part R of the support leg 3. The cushion 50 may be provided closer to the rear end than the front end of the support leg 3. The cushion 50 may be provided on the curved part 31. The cushion 50 may be provided on a surface, which faces the user's head H, of the curved part 31.

The cushion 50 may be provided on the inner side surface between the inner side surface and the outer side surface of the rear part R. The cushion 50 may be disposed in contact with the rear surface among the front surface HF, side surface HS and rear surface HR of the wearer's head H or in contact with the boundary between the rear surface HR and the side surface HS. The cushion 50 may function as a stopper which is caught on the rear part of the wearer's ear E when the wearer inclines his/her head. The cushion 50 may prevent the head-mounted display from being taken off while rubbing against the back part of the wearer's head.

The load adjuster 5 may be provided on the left support leg 3A and the right support leg 3B. That is, a virtual reality device may include a left load adjuster installed on the left support leg 3A to adjust the load applied from the left support leg 3A to the wearer's head and a right load adjuster provided on the right support leg 3B to adjust the load applied from the right support leg 3B to the wearer's head. The left load adjuster and the right load adjuster are equal to each other except that the installation positions thereof are different. Hereinafter, the load adjuster 5 will be described in order to avoid a repeated description.

Figure 4:
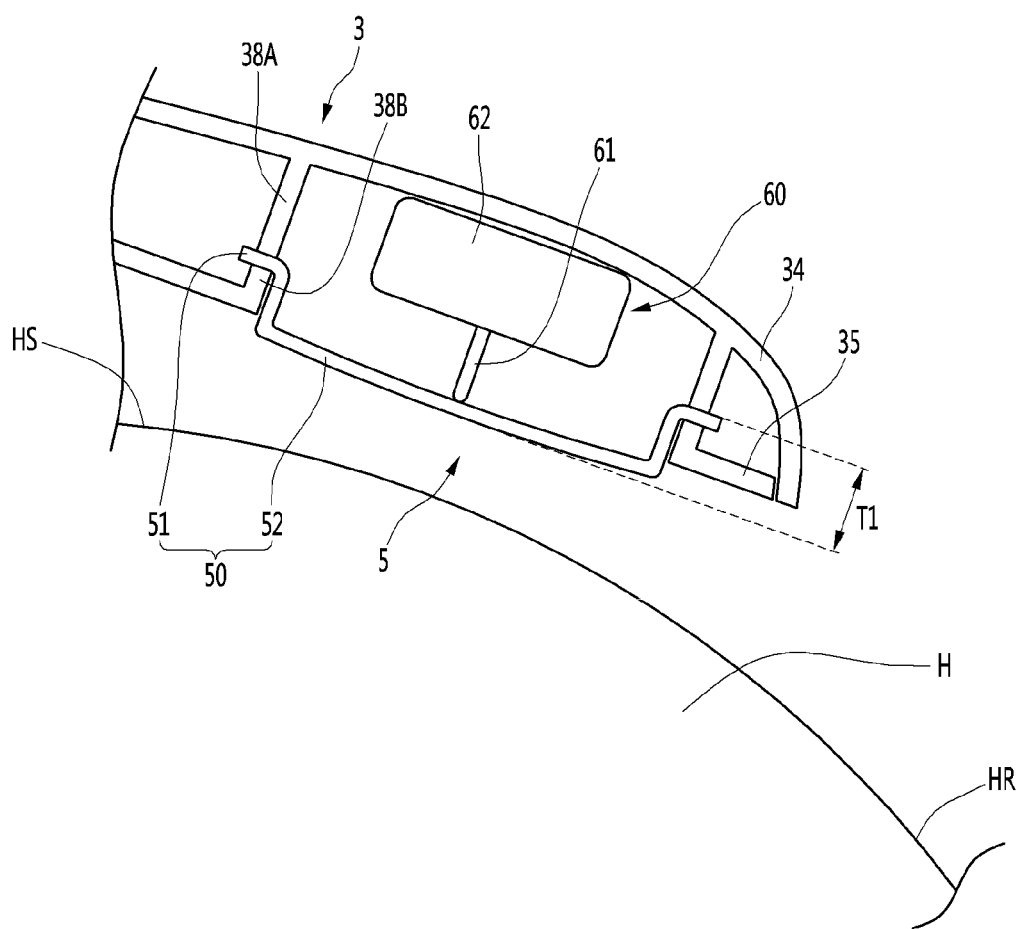
FIG. 4 is an enlarged cross-sectional view when the head-mounted display according to the first embodiment of the present invention is in a normal mode.
Figure 5:
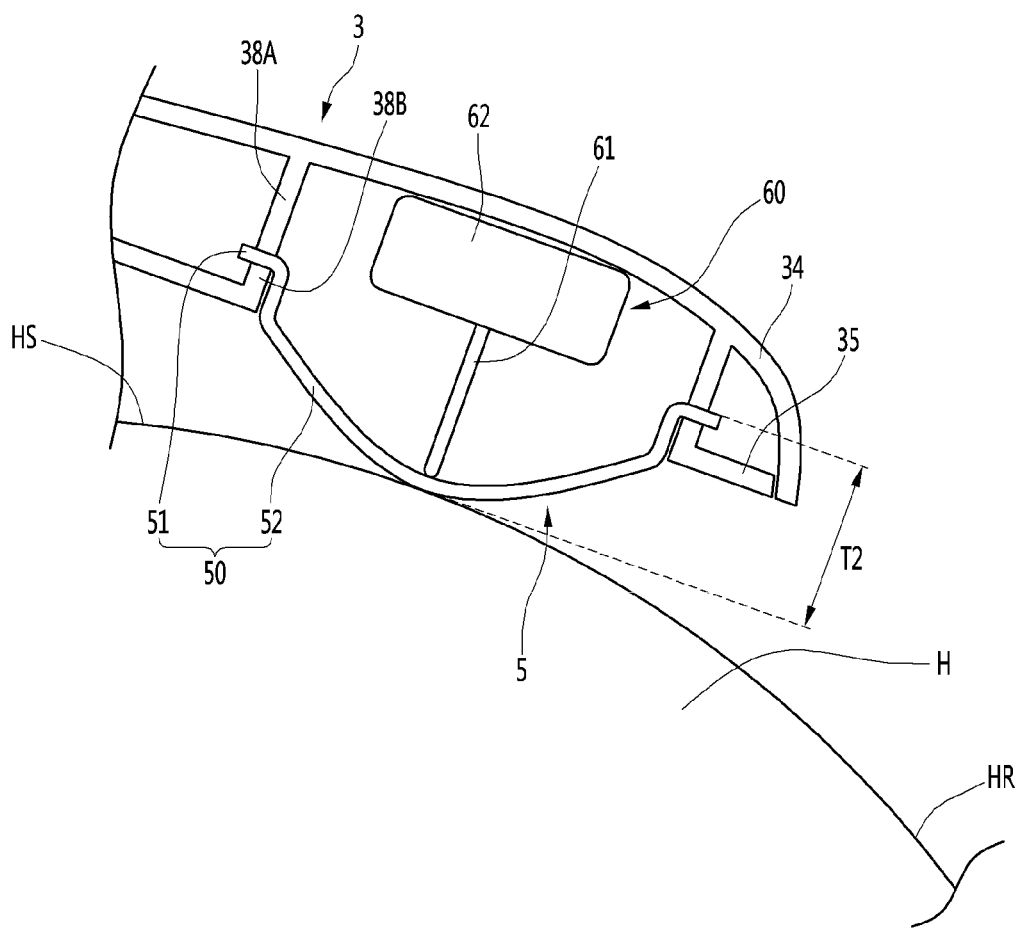
FIG. 5 is an enlarged cross-sectional view when the head-mounted display according to the first embodiment of the present invention is in a pressing mode.

FIG. 4 is an enlarged cross-sectional view when the head-mounted display according to the first embodiment of the present invention is in a normal mode, and FIG. 5 is an enlarged cross-sectional view when the head-mounted display according to the first embodiment of the present invention is in a pressing mode.

The load adjuster 5 may include a cushion advance/retreat mechanism 60 which is controlled by a controller 8 to enable the cushion 50 to advance toward the wearer's head H as shown in FIG. 5 or to enable the cushion 50 to retreat toward the support leg 3 as shown in FIG. 4.

The cushion 50 may include a connection part 51 connected to the support leg 3 and a deformation part 52 spaced apart from the support leg 3. Here, at least one of the position or the shape of the deformation part 52 may be deformed by the cushion advance/retreat mechanism 60. The deformation part 52 of the cushion 50 may operate by the cushion advance/retreat mechanism 60 in a state in which the connection part 51 is connected to the support leg 3.

The connection part 51 may be connected to the support leg 3 to restrict arbitrary detachment of the cushion 50 and support the cushion 50 on the support leg 3. The connection part 50 may be an edge part between the edge part and the center part of the cushion 50. The connection part 51 may be fixed by an adhesive means such as an adhesive or insertion parts 38A and 38B such as a clip or an insertion rib formed in the support leg 3. The connection part 51 may be attached to the inner side surface 32 of the inner body 34. The connection part 51 may be fixedly inserted between the inner body 35 and the inner body 34.

The deformation part 52 of the cushion 50 is not directly connected to the support leg 3 and the position or shape thereof may be deformed. The deformation part 51 may be a center part between the edge part and the center part of the cushion 50. The cushion 50 may be made of a fiber material or an elastic material such that the position or shape of the deformation part 52 is changed. The cushion 50 may be formed of a material restored to an original shape thereof when external force is removed.

The deformation part 52 may be a pressing load changing part for changing the pressing load applied from the cushion 50 to the wearer's head H. The pressing load applied from the cushion 50 to the wearer's head H may be pressure applied to the wearer's head H and may be force applied by the support legs 2 and 3 in a lateral direction.

At least a part of the deformation part 52 may advance and retreat between the support leg 3 and the wearer's head H.

The pressing load applied from the cushion 50 to the wearer's head H may not be present or may be small when the deformation 52 is close to the support leg 3 and may be large when the deformation part 52 is far from the support leg 3.

The deformation part 52 may have a flat shape or a substantially flat shape and may have a convex shape toward the wearer's head H.

The deformation part 52 may have a flat shape or a substantially flat shape when external force is not applied and may be deformed to a convex shape toward the wearer's head H when external force is applied by the cushion advance/retreat mechanism 60. Hereinafter, for convenience, deformation of the deformation part 52 in a direction close to the support leg 3 as shown in FIG. 4 will be described as retreat of the cushion (or retreat of the deformation part) and deformation of the deformation part 52 in a direction close to the wearer's head H will be described as advance of the cushion (or advance of the deformation part).

When the head-mounted display is worn, the deformation part 52 is not brought into contact with the wearer's head H, and, when the deformation part 52 is moved by the cushion advance/retreat mechanism 60, the deformation part is brought into contact with the wearer's head H to be pressed to the wearer's head H.

When the head-mounted display is worn, the deformation part 52 may be brought into contact with the wearer's head H and but the pressing load applied to the wearer's head H may be small. When the deformation part 52 is moved by the cushion advance/retreat mechanism 60, the pressing load applied to the wearer's head H may be large.

The thickness and, more particularly, the maximum thickness T1 of the cushion 50 in the normal mode of the cushion advance/retreat mechanism 60 may be small as shown in FIG. 4 and the thickness and, more particularly, the maximum thickness T2 of the cushion 50 in the pressing mode of the cushion advance/retreat mechanism 60 may be greater than the maximum thickness T1 in the normal mode as shown in FIG. 5.

The cushion advance/retreat mechanism 60 may include a motor 62 installed in the support leg 3. The motor 62 may have a motor shaft 61 connected to the cushion 50.

The motor 62 is an actuator for operating the cushion 50 controlled by the controller 8, the motor shaft 61 of the motor 62 may be directly connected to the cushion 50 to deform the cushion 50 or may be connected to the cushion 50 through a power transmission member to deform the cushion 50 through the power transmission member. Hereinafter, in the present embodiment, assume that the motor shaft 61 is directly connected to the cushion 50.

The motor shaft 61 may be connected to a surface, which faces the support leg 3, of the cushion 50 through an adhesive means such as an adhesive or a connection member such as a clip, a clamp or a pin.

The motor 62 may be a linear motor for enabling the motor shaft 61 to advance and retreat. The motor 62 may enable linear reciprocating movement of the motor shaft 61 upon being driven. The motor 62 may be installed to be located between the outer body of the support leg 3 and the cushion 50. The motor 62 may be installed in the outer body 34 and the cushion 50 may be disposed to cover the motor 62 to protect the motor 62. The cushion 50 may also function as a motor cover function for protecting the motor 62.

The motor 62 may have an advance mode for moving the motor shaft 61 in an outward direction of the motor 62 as shown in FIG. 5 and a retreat mode for moving the motor shaft 61 in the inward direction of the motor 62 as shown in FIG. 4.

The motor shaft 61 may be disposed orthogonally to the longitudinal direction of the support leg 3. When the support leg 3 extends in a front-and-rear direction, the motor shaft 62 may be disposed in a left-and-right direction and, when the support leg 3 extends in the left-and-right direction, the motor shaft 52 may be disposed in the front-and-rear direction.

Figure 6:
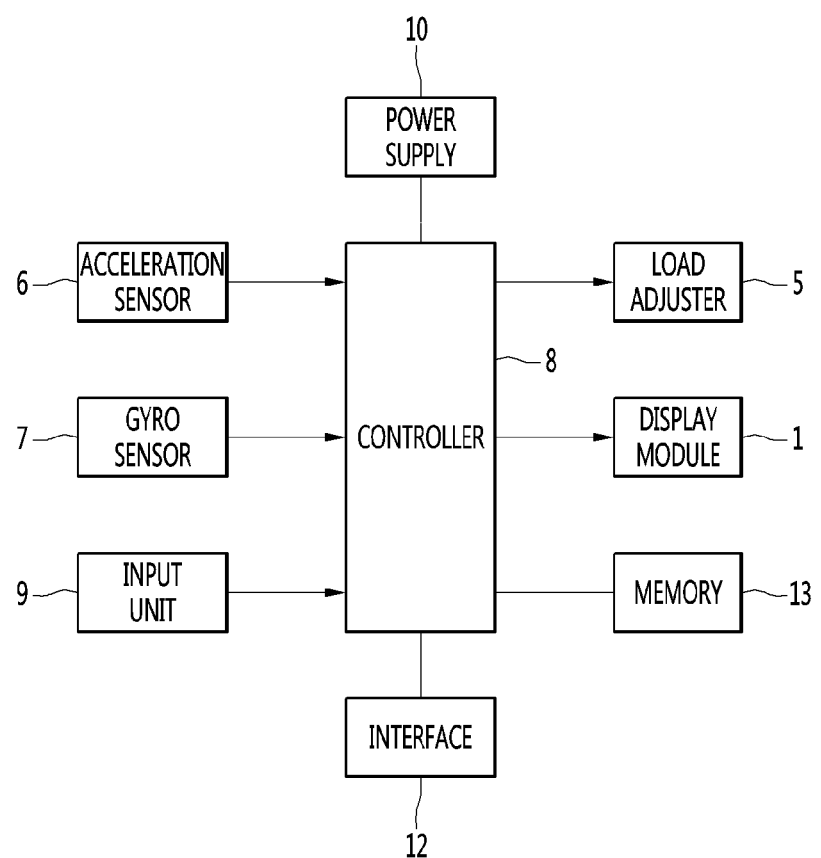
FIG. 6 is a control block diagram of the head-mounted display according to the first embodiment of the present invention.

FIG. 6 is a control block diagram of the head-mounted display according to the first embodiment of the present invention.

The head-mounted display may further include motion sensors 6 and 7 for sensing motion of the wearer's head H. The motion sensors 6 and 7 may include an acceleration sensor 6 and a gyro sensor 7 installed in the head-mounted display. The motion sensors 6 and 7 may sense motion of the head-mounted display and thus sense motion of the wearer's head H. The acceleration sensor 6 and the gyro sensor 7 may be installed in any one of the display module 1, the case 2 and the support leg 3.

The acceleration sensor 6 may measure the acceleration of the head-mounted display and output the measured value to the controller 8. The gyro sensor 7 may measure the angular speed of the head-mounted display and output the measured value to the controller 8.

The head-mounted display may further include an input unit 9 for enabling the wearer to input a manipulation command. The input unit 9 may include a manipulation unit such as a button part installed in the case 2 or the support leg 3. The input unit 9 may include a sensor unit such as a touch sensor installed in the case 2 or the support leg 3.

The head-mounted display may further include a power supply 10. Under control of the controller 8, external or internal power is supplied to the components included in the head-mounted display. The power supply 10 includes a battery. The battery may be an embedded battery or a replaceable battery.

The head-mounted display may further include an interface 12. The interface 12 is a passage for connecting the head-mounted display to an external device. For example, the interface 12 may be at least one of a connection terminal for connection with other devices (e.g., a computer and a mobile terminal), a port for near-field communication (e.g., infrared (IrDA) port and a Bluetooth port), a wireless LAN port), or a power supply terminal for supplying power to the head-mounted display. The interface 12 may be implemented in the form of a SIM (Subscriber Identification Module), a UIM (User Identity Module), or a socket for receiving an external card such as a memory card for storing information.

The head-mounted display may further include a memory 13. The memory 13 stores data supporting various functions of the head-mounted display. The memory 13 may store a plurality of application programs executed in the head-mounted display and data and commands for operation of the head-mounted display. At least some of the application programs may be downloaded from an external server through wireless communication. Meanwhile, the application programs may be stored in the memory 13 and executed to perform operation (or function) of the mobile terminal by the controller 8.

The controller 8 controls whole operation of the head-mounted display in addition to operation related to the application programs. The controller 8 may process signals, data or data input or output through the above-described components or execute the application programs stored in the memory 13, thereby providing or processing suitable information or functions to the wearer.

The controller 8 may adjust the load applied to the wearer's head H according to the static situation and the dynamic situation upon using the head-mounted display, such that the head-mounted display can be more stably worn.

The controller 8 may control the load adjuster 5 according to the sensed results of the motion sensors 6 and 7. The controller 8 may distinguish between the static situation and the dynamic situation according to the sensed values of the motion sensors 6 and 7. The controller 8 may control the load adjuster 5 in a normal mode or a pressing mode. The controller 8 may control the load adjuster 5 in the normal mode in the static situation and control the load adjuster 5 in the pressing mode in the dynamic situation.

The controller 8 may compare at least one of the measured value of the acceleration sensor 6 or the measured value of the gyro sensor 7 with a reference value and control the load adjuster 5 in the normal mode or the pressing mode according to the result of comparison.

The controller 8 may output a signal for controlling the load adjuster 5 in the normal mode to the load adjuster 5 when the measured value of the acceleration sensor 6 or the measured value of the gyro sensor 7 is equal to or less than the reference value. The controller 8 may output a signal for controlling the load adjuster 5 in the pressing mode to the load adjuster 5 when the measured value of the acceleration sensor 6 or the measured value of the gyro sensor 7 exceeds the reference value.

Here, the normal mode may be a mode in which the support leg 3 does not have a pressing load applied to the wearer's head or a mode in which the pressing load applied to the wearer's head is low, and the pressing mode may be a mode in which the pressing load applied to the wearer's head is high.

The controller 8 may determine that the head-mounted display is currently in the static situation when new motion change is not sensed by the motion sensors 6 and 7 or motion is insignificant and control the load adjuster 5 and, more particularly, the motor 62 in the normal mode such that the pressing load caused by the support leg 3 is low.

The controller 8 may determine that the head-mounted display is currently in the dynamic situation when new motion change is sensed by the motion sensors 6 and 7 and such motion is equal to or greater than a predetermined value and control the load adjuster 5 and, more particularly, the motor 62 in the pressing mode such that the pressing load caused by the support leg 3 is high.

In the pressing mode of the load adjuster 5 by the controller 8, the motor 62 moves the motor shaft 61 in the outward direction of the motor 62, and the cushion 50 may increase the pressing load applied to the wearer's head H while increasing the whole thickness by the motor 62.

In addition, the cushion 50 may be caught in a forward direction in the rear region of the ear of the wearer's head H, and may be strongly adhered to the wearer's head H by pressing force. As the pressing load applied from the cushion 50 to the wearer's head H is increased, separation of the support leg 3 from the wearer's head H may be minimized and shaking of the head-mounted display may be minimized. Even when the wearer inclines his/her head forwardly, the head-mounted display may be maintained in a state of being stably worn on the wearer's head H.

Meanwhile, in the pressing mode of the load adjuster 5, if new motion change is not sensed by the motion sensors 6 and 7 or if motion is insignificant, the controller 8 may change the load adjuster 5 to the normal mode.

In the normal mode of the load adjuster 5, the motor 62 may insert the motor shaft 61 in the inward direction of the motor 62, and the cushion 50 may decrease the pressing load applied to the wearer's head H while decreasing the whole thickness of the motor 62. As the pressing load applied from the cushion 50 to the wearer's head H is decreased, the wearer may feel good wearing comfort.

Figure 7:
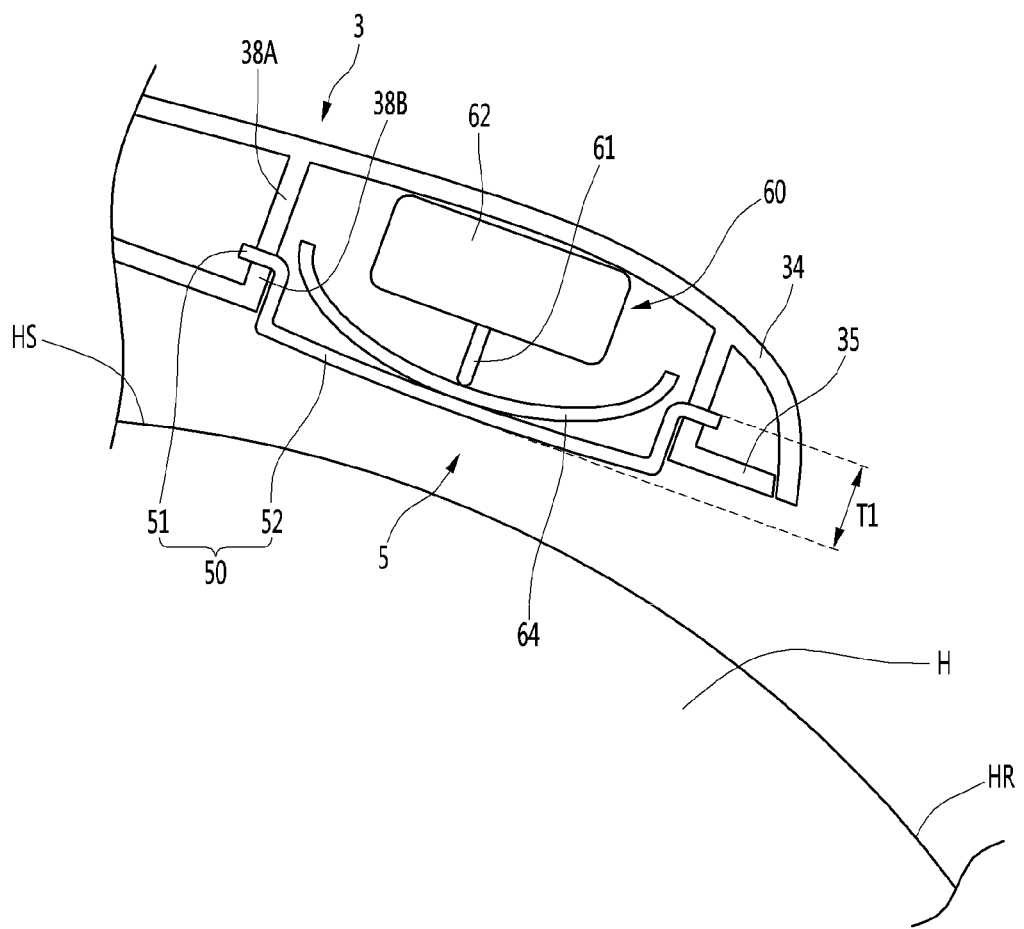
FIG. 7 is an enlarged cross-sectional view when a head-mounted display according to a second embodiment of the present invention is in a normal mode.
Figure 8:
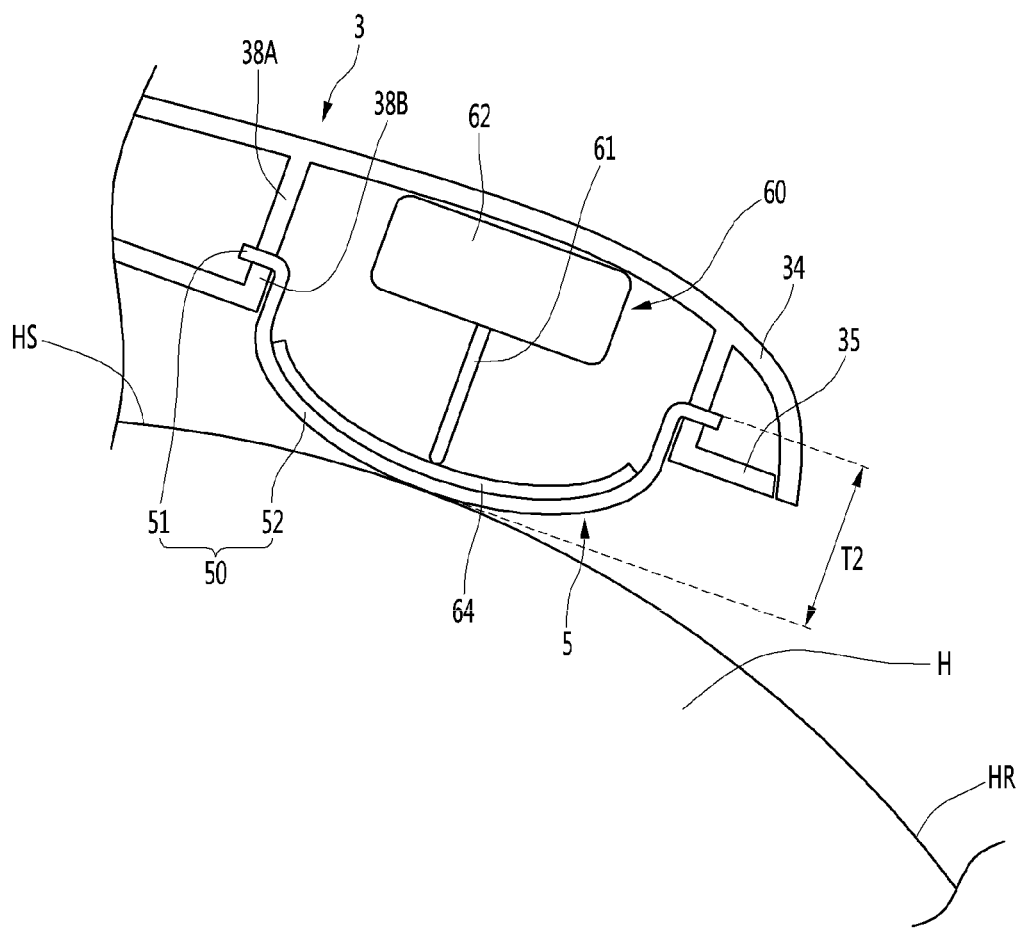
FIG. 8 is an enlarged cross-sectional view when the head-mounted display according to the second embodiment of the present invention is in a pressing mode.

FIG. 7 is an enlarged cross-sectional view when a head-mounted display according to a second embodiment of the present invention is in a normal mode, and FIG. 8 is an enlarged cross-sectional view when the head-mounted display according to the second embodiment of the present invention is in a pressing mode.

In the present embodiment, the cushion advance/retreat mechanism 60 may include a motor 62 installed in the support leg 3 and having the motor shaft 61 and a cushion contact member 64 connected to the motor shaft 61 and disposed to be brought into contact with the cushion 50.

The present embodiment is different from the first embodiment of the present invention in that the motor shaft 61 is not directly connected to the cushion 50 and is connected through the cushion contact member 64 and is similar to the first embodiment of the present invention in the configuration other than the cushion contact member 64, and a detailed description thereof will be omitted in order to avoid a repeated description.

The cushion contact member 64 may be located between the motor 62 and the cushion 50. The cushion contact member 64 may be formed to be in surface contact with one surface of the cushion 50. The cushion 50 may be formed in a plate shape. The cushion 50 may be formed in a flat plate shape or a curved plate shape. The cushion contact member 64 may be formed in a curved plate which is convex in a direction facing the cushion 50. One surface of the cushion contact member 64 may face the cushion 50 and the other surface thereof may face the motor 62.

One surface of the cushion contact member 64 may be connected to the cushion 50 through an adhesive means such as an adhesive or a connection member such as a clip, a coupler or a pin.

The cushion contact member 64 may press the cushion 50 such that the cushion 50 advances toward the wearer's head H upon advance as shown in FIG. 8 and move away from the wearer's head H to receive a portion of the motor 62 upon retreat as shown in FIG. 7.

The cushion contact member 64 may deform the cushion 50 such that the cushion 50 swells up with a soft curved surface, and the cushion 50 does not intensively deform only a specific portion of the deformation portion 52 but presses the wearer's head H while the deformation portion 52 evenly swells.

Figure 9:
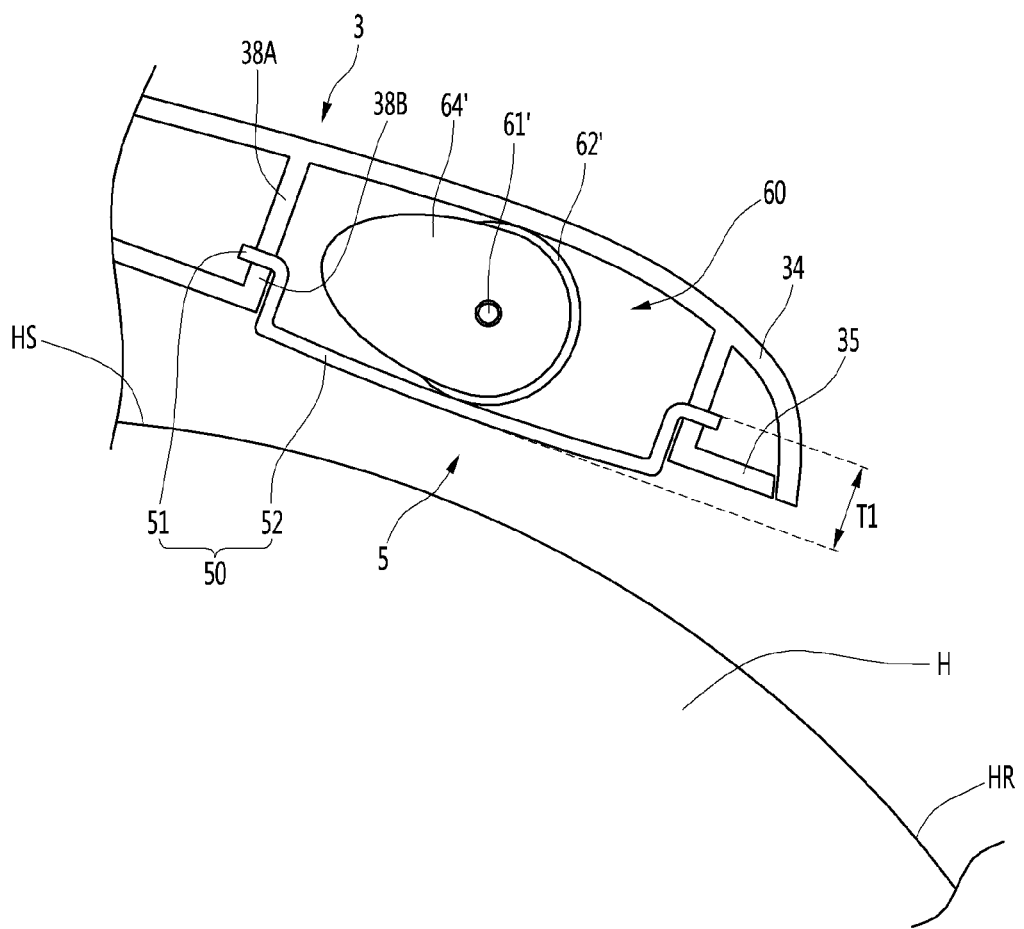
FIG. 9 is an enlarged cross-sectional view when a head-mounted display according to a third embodiment of the present invention is in a normal mode.
Figure 10:
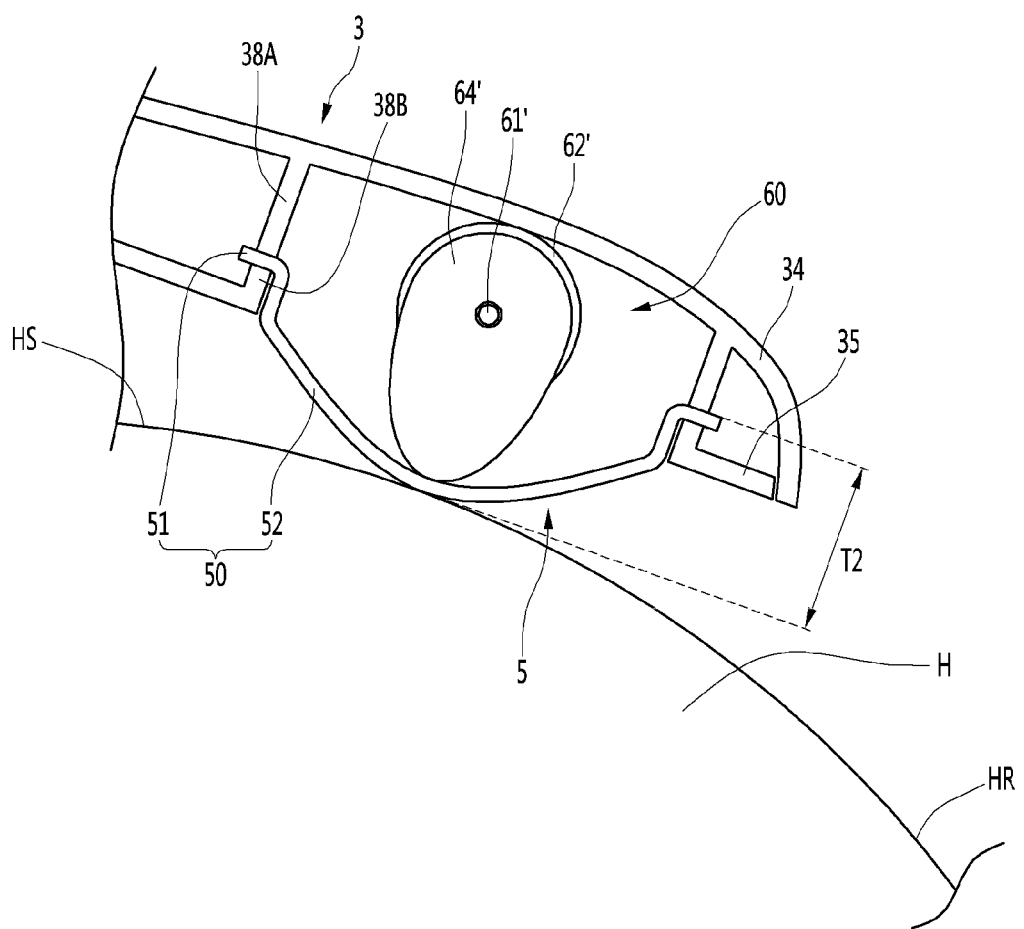
FIG. 10 is an enlarged cross-sectional view when the head-mounted display according to the third embodiment of the present invention is in a pressing mode.

FIG. 9 is an enlarged cross-sectional view when a head-mounted display according to a third embodiment of the present invention is in a normal mode, and FIG. 10 is an enlarged cross-sectional view when the head-mounted display according to the third embodiment of the present invention is in a pressing mode.

The present embodiment may include a motor 62' having a motor shaft 61' and the cushion contact member may be a power transmission member for pushing the cushion 50 toward the wearer's head H by the motor shaft 61', as shown in FIG. 10, when the motor shaft 61' rotates in one direction (e.g., a clockwise direction) and pulling the cushion 50 in the opposite direction of the wearer's head H by the motor shaft 61', as shown in FIG. 9, when the motor shaft 61' rotates in the other direction (e.g., the counterclockwise direction).

The cushion contact member may include a cam 64' located between the support leg 3 and the cushion 50. The cam 64' may be a flat cam or a stereoscopic cam and convert rotational motion of the motor 62' between the motor 62' and the cushion 50 into linear motion of the cushion 50. The cam 64' may be brought into contact with the cushion 50 and may enable the cushion 50 to advance or retreat according to the rotation position thereof. The cam 64' may press the cushion 50 in a state of being located between the support leg 3 and the cushion 50. The cam 64' may change the pressing force applied to the cushion 50 according to a portion which is brought into contact with the cushion 50. The present embodiment is equal or similar to the second embodiment in the other configuration and operation, and a detailed description thereof will be omitted in avoid a repeated description.

The motor 62' may rotate the motor shaft 61'. The motor 62 may be a step motor.

The motor 62' may be controlled by the controller 8 as in the first embodiment or the second embodiment.

The motor 62' may be installed in the support leg 3 such that the motor shaft 61' is vertically provided. In this case, the cam 64' may be located above or below the motor 62'. The cam 64' may be horizontally disposed in a state of being connected to the motor shaft 61' and may deform the cushion 50 at the lateral side of the cushion 50.

The motor 62' may be disposed such that the motor shaft 61' extends in the longitudinal direction of the support leg 3. In this case, the cam 64' may be located at the front side or rear side of the motor 62'. The cam 64' may be vertically disposed in a state of being connected to the motor shaft 61' and deform the cushion 50 at the lateral side of the cushion 50.

The present embodiment may be similar to the first embodiment or the second embodiment of the present invention in the configuration and operation other than the cam 64' and the motor 62', and a detailed description thereof will be omitted in order to avoid a repeated description.

Figure 11:
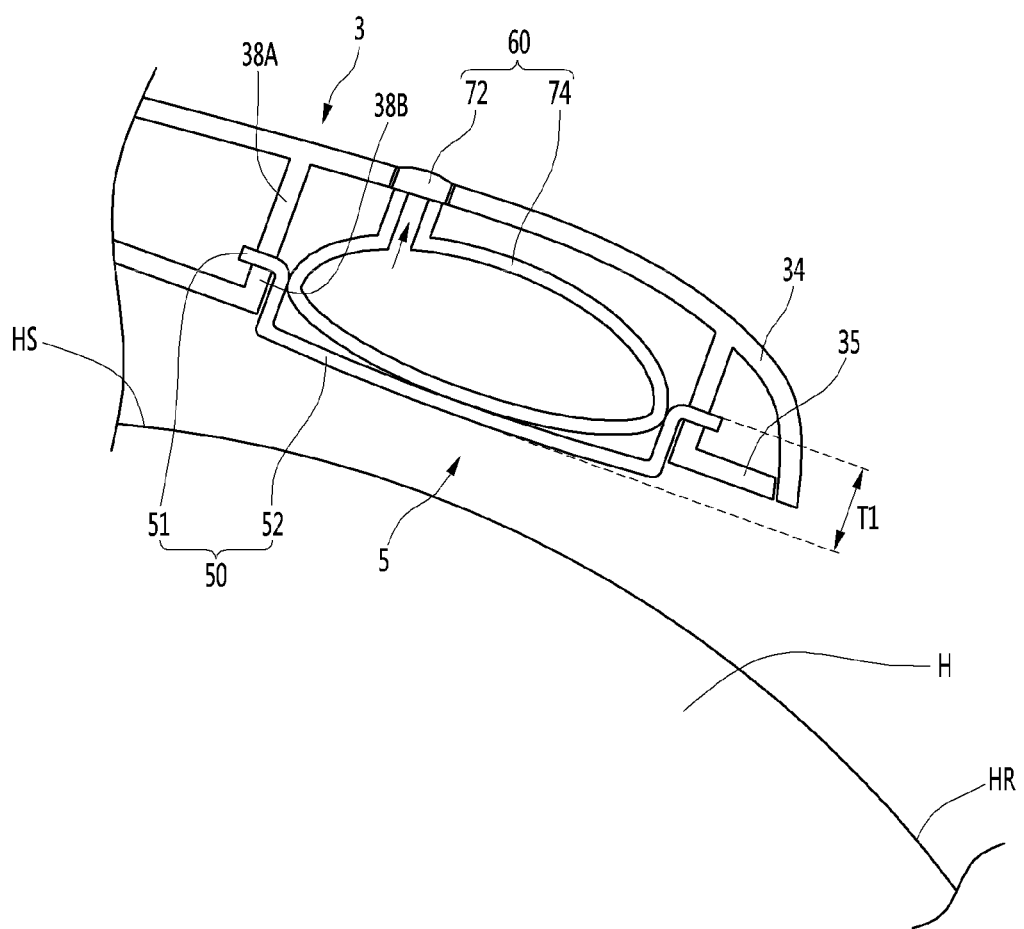
FIG. 11 is an enlarged cross-sectional view when a head-mounted display according to a fourth embodiment of the present invention is in a normal mode.
Figure 12:
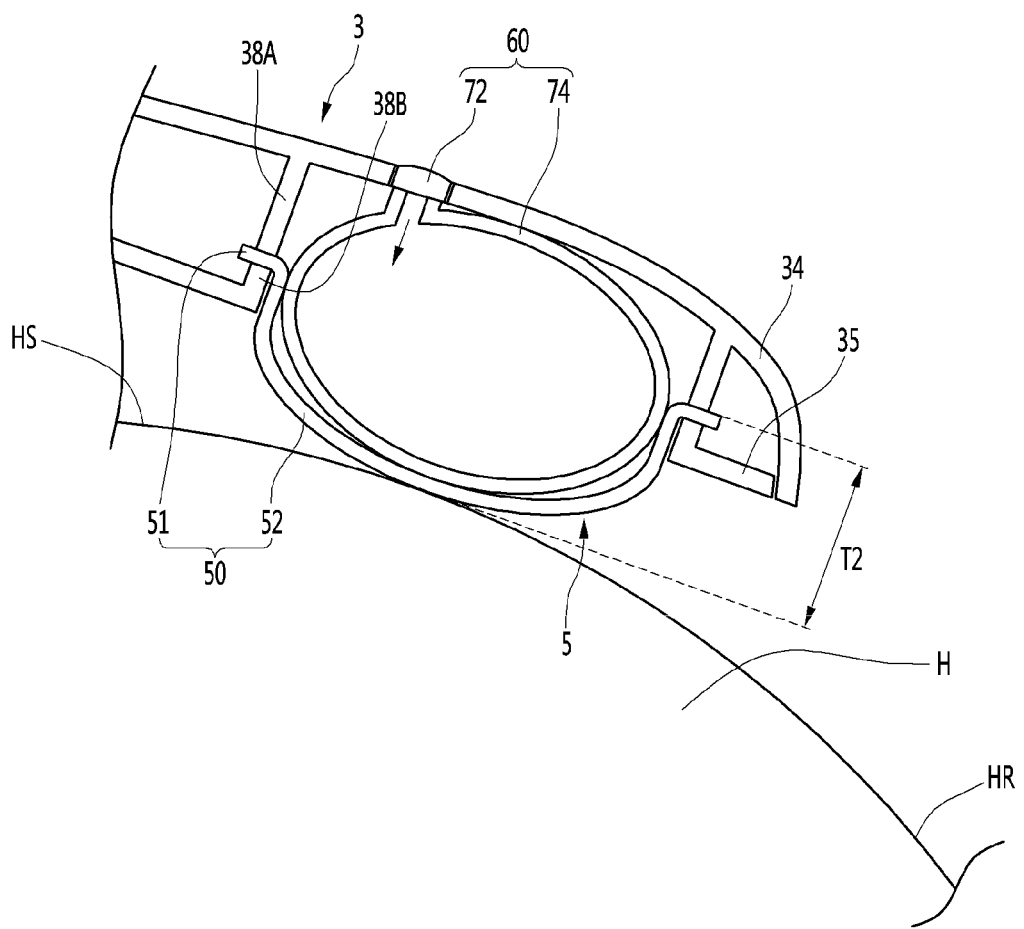
FIG. 12 is an enlarged cross-sectional view when the head-mounted display according to the fourth embodiment of the present invention is in a pressing mode.

FIG. 11 is an enlarged cross-sectional view when a head-mounted display according to a fourth embodiment of the present invention is in a normal mode, and FIG. 12 is an enlarged cross-sectional view when the head-mounted display according to the fourth embodiment of the present invention is in a pressing mode.

The present embodiment may include an airbag 74 for inflating or contracting the cushion advance/retreat mechanism 60 by air to enable the cushion 50 to advance or retreat and an air regulator 72 for regulating air of the airbag 74. The present embodiment may be equal or similar to one of the first to third embodiments of the present invention in the other configuration and operation, and a detailed description thereof will be omitted in order to avoid a repeated description.

The air regulator 72 may include an air supplier such as an air compressor or an inflator installed in the support leg 3 to supply air to the airbag 74. The air regulator 72 may further include an air ejector for ejecting air of the airbag 72. The air ejector may include an air suction unit for applying suction force to the inside of the airbag 74 to suck air of the airbag 74 and an air valve for ejecting air of the airbag 74.

The air regulator 72 may be controlled to be in the pressing mode for inflating the airbag 74 by the controller 8 as shown in FIG. 12. The air regulator 72 may forcibly introduce air to the airbag 74 in the pressing mode. The air regulator 72 may be controlled to be in the normal mode for contracting the airbag 74 by the controller 8 as shown in FIG. 11. The air regulator 72 may eject air inside the airbag 74 to the outside in the normal mode.

One side of the air regulator 72 may be exposed to the outside of the support leg 3 such that air outside the support leg 3 is sucked and supplied to the airbag 74. The air regulator 72 may suck air outside the support leg 3 through a separate air passage formed in the support leg 3 or ejects air to the outside of the support leg 3.

The airbag 74 may be disposed between the support leg 3 and the cushion 50 to apply pressing force to the cushion 50. When the airbag 74 is disposed between the support leg 3 and the cushion 50, one side thereof may be fixed to one surface of the cushion 50.

The airbag 74 may be disposed inside the cushion 50 to inflate the cushion 50. In this case, the cushion 50 may be an airbag built-in cushion.

In the pressing mode of the air regulator 72, the air regulator 72 may supply air to the airbag 74 to inflate the airbag 74 as shown in FIG. 12, and the airbag 74 may be inflated between the support leg 3 and the cushion 50 to press the cushion 50 toward the wearer's head H.

In the normal mode of the air regulator 72, the air regulator 72 may suck and eject air of the airbag 74 to contract the airbag 74 as shown in FIG. 11, the pressing force applied from the airbag 74 to the cushion 50 may be decreased, and the pressing load applied from the cushion 50 to the wearer's head H may be decreased.

Figure 13:
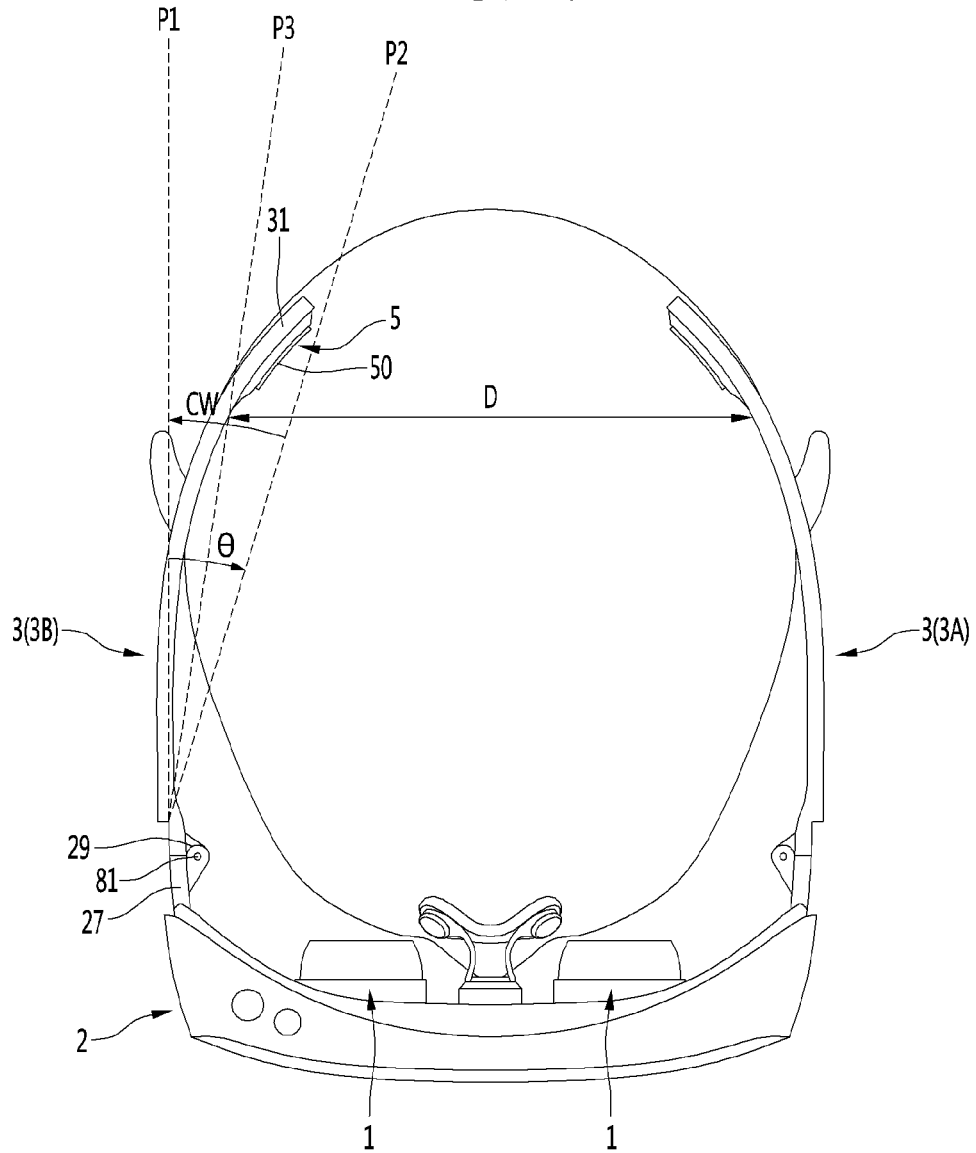
FIG. 13 is a side view of a head-mounted display according to a fifth embodiment of the present invention.
Figure 14:
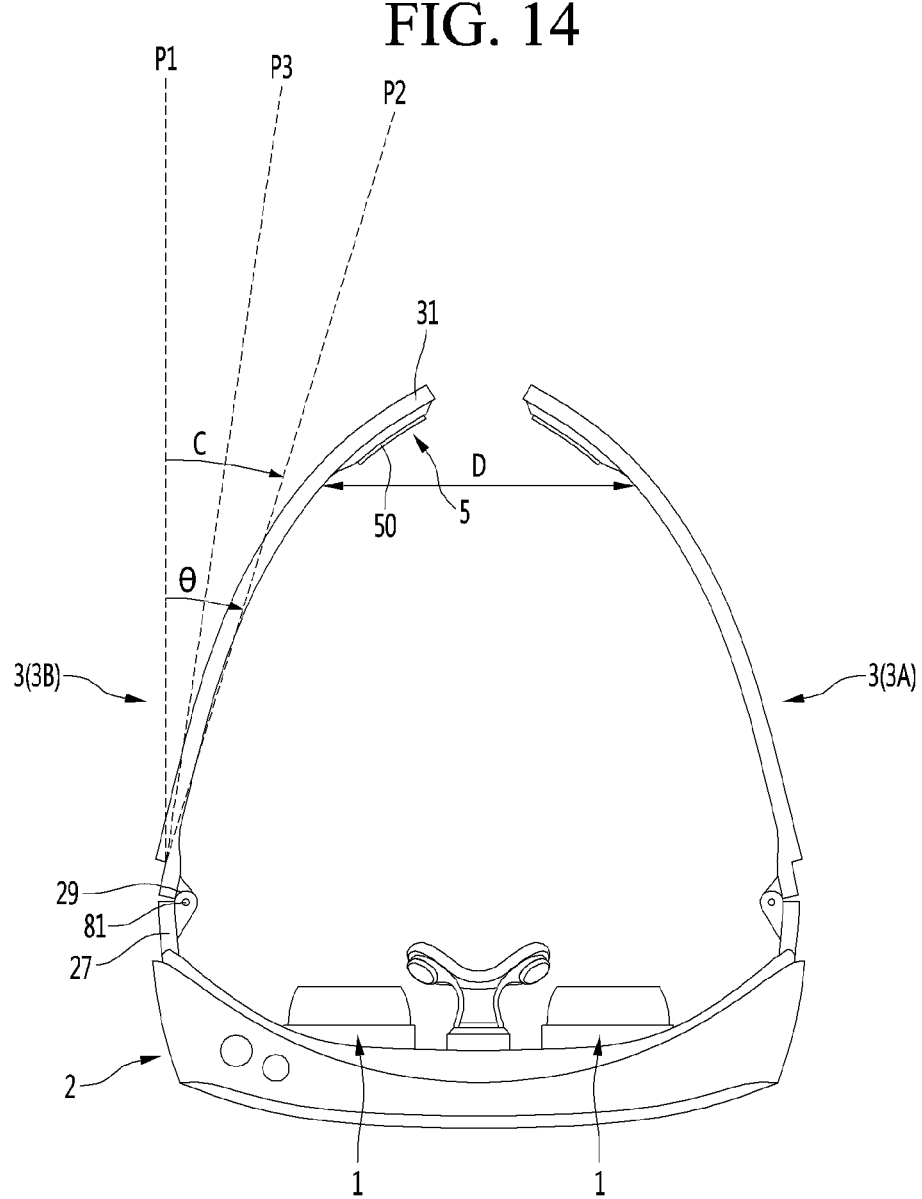
FIG. 14 is an enlarged cross-sectional view when a head-mounted display according to the fifth embodiment of the present invention is in a normal mode.
Figure 15:
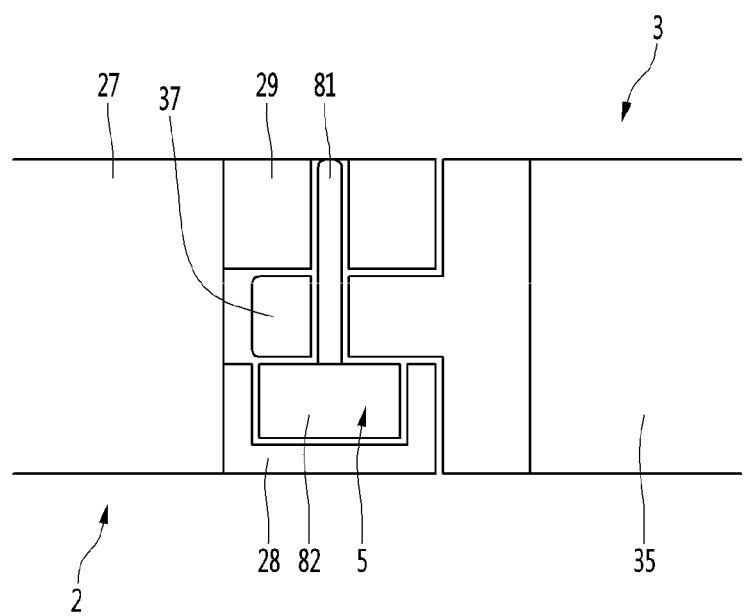
FIG. 15 is an enlarged cross-sectional view when the head-mounted display according to the fifth embodiment of the present invention is in a pressing mode.

FIG. 13 is a side view when a head-mounted display according to a fifth embodiment of the present invention is a normal mode, FIG. 14 is a plan view when a head-mounted display according to the fifth embodiment of the present invention is in a pressing mode, and FIG. 15 is a cross-sectional view when the head-mounted display according to the fifth embodiment of the present invention.

The load adjuster 5 of the present embodiment may include a motor 82 installed in the case 2 and controlled by the controller 8, and the motor 82 may include a support leg rotation shaft 81 connected to the support leg 3 to rotate the support leg 3.

In the load adjuster 5 of the present embodiment, the motor 82 may rotate the support leg 3 to change the angle of the support leg 3.

The support leg connectors 27 formed in the case 2 may include a motor reception part 28 in which the motor 82 is received. The support leg connectors 27 formed in the case 2 may further include a rotation shaft support part 29 rotatably supporting the rotation shaft 81.

One surface of the motor reception part 28 may be opened and the motor 82 may be inserted into and received in the motor reception part 28. The motor reception part 28 and the rotation shaft support part 29 may be installed to face the support leg connectors 27. The rotation shaft support part 29 may have a hole or groove in which the rotation shaft 82 is rotatably supported.

The support leg 3 may be provided with a rotation shaft connector 37 for connecting the rotation shaft 81 and may be rotated along with the rotation shaft 81 when the rotation shaft 81 is rotated. The support leg 3 may be connected to the case 2 by the motor 82 and may be rotated by the motor 82.

The rotation shaft connector 37 may be located between the motor reception part 28 and the rotation shaft support part 29, and, when the motor 82 is driven, the rotation shaft 81 may be rotated between the motor reception part 28 and the rotation shaft support part 29.

In the present embodiment, when the motor 82 is driven, the rotation shaft 81 may be rotated to apply torque to the support leg 3 and the load applied to the wearer's head may be increased or decreased due to the generated torque.

The controller 8 may rotate the rotation shaft 81 in a direction C in which a distance D between the pair of support legs 3 is decreased in the pressing mode as shown in FIG. 14 and the pair of support legs 3 may be rotated by a predetermined angle in a maximally unfolded state. Here, the direction C in which the distance D between the pair of support legs 3 is decreased may be the head direction of the wearer. The pair of support legs 3 may be rotated in the direction C, in which the pair of support legs is close to each other, to press the wearer's head H while contracting.

The controller 8 may reversely rotate the rotation shaft 81 in a direction in which the distance D between the pair of support legs 3 is increased in the normal mode as shown in FIG. 13 and the pair of support legs 3 may be reversely rotated to a maximally unfolded position. The pair of support legs 3 may be unfolded in a direction CW, in which the pair of support legs moves away from each other, and the pressing force is not applied to the wearer's head H or the pressing force applied to the wearer's head H may be minimized.

Meanwhile, in the present embodiment, it is possible to control the rotation shaft 81 in multiple stages, that is, at least three stages, according to the degree of motion of the head-mounted display. The controller 8 may drive the motor 82 in a normal mode for rotating the support leg 3 to a first position P1 where the pressing force applied from the support leg 3 to the wearer's head H is minimized, a high pressing mode for rotating the support leg 3 to a second position P2 where the pressing force applied from the support leg 3 to the wearer's head H is maximized and a low pressing mode for rotating the support leg 3 between a third position P3 between the first position P1 and the second position P2.

The controller 8 may control the motor 82 such that the rotation angle θ of the rotation shaft 81 is gradually increased when the pair of support legs 3 is maximally unfolded in proportion to the degree of motion of the head-mounted display.

The controller 8 may control the rotation angle θ of the support leg 3 stepwise according to the number of control stages of the motor 82, and the pressing force applied from the support leg 3 to the wearer's head H may be controlled in multiple stages by the number of control stages of the motor 82.

The rotation shaft 81 and the motor 82 of the present embodiment may be provided instead of the cushion 50 and the cushion advance/retreat mechanism 60 of the first to fourth embodiments of the present invention, or may be provided along with the cushion 50 and the cushion advance/retreat mechanism 60 of the first to fourth embodiments of the present invention, thereby adjusting the pressing load applied to the wearer's head H along with the cushion 50 and the cushion advance/retreat mechanism 60.

Figure 16:
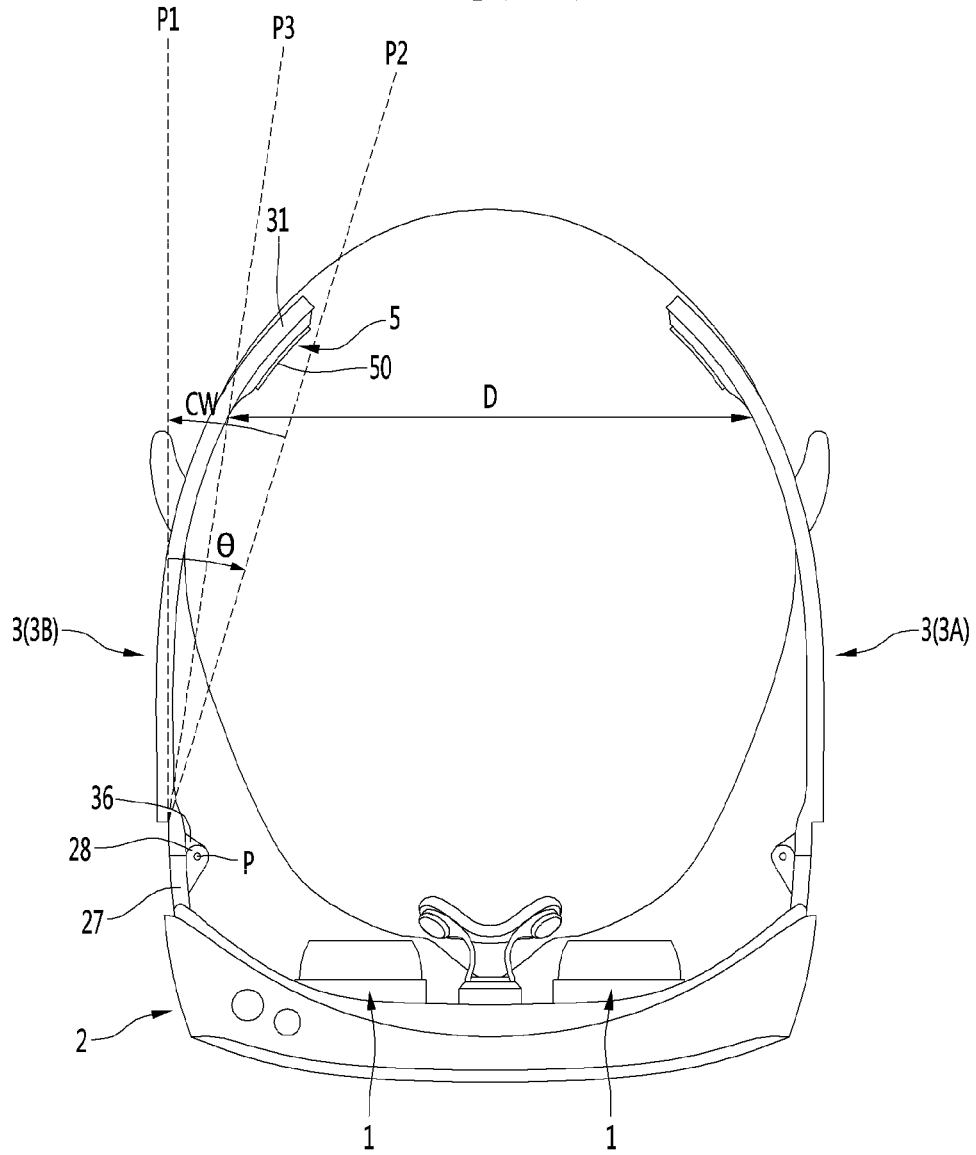
FIG. 16 is an enlarged cross-sectional view when a head-mounted display according to a sixth embodiment of the present invention is in a normal mode.
Figure 17:
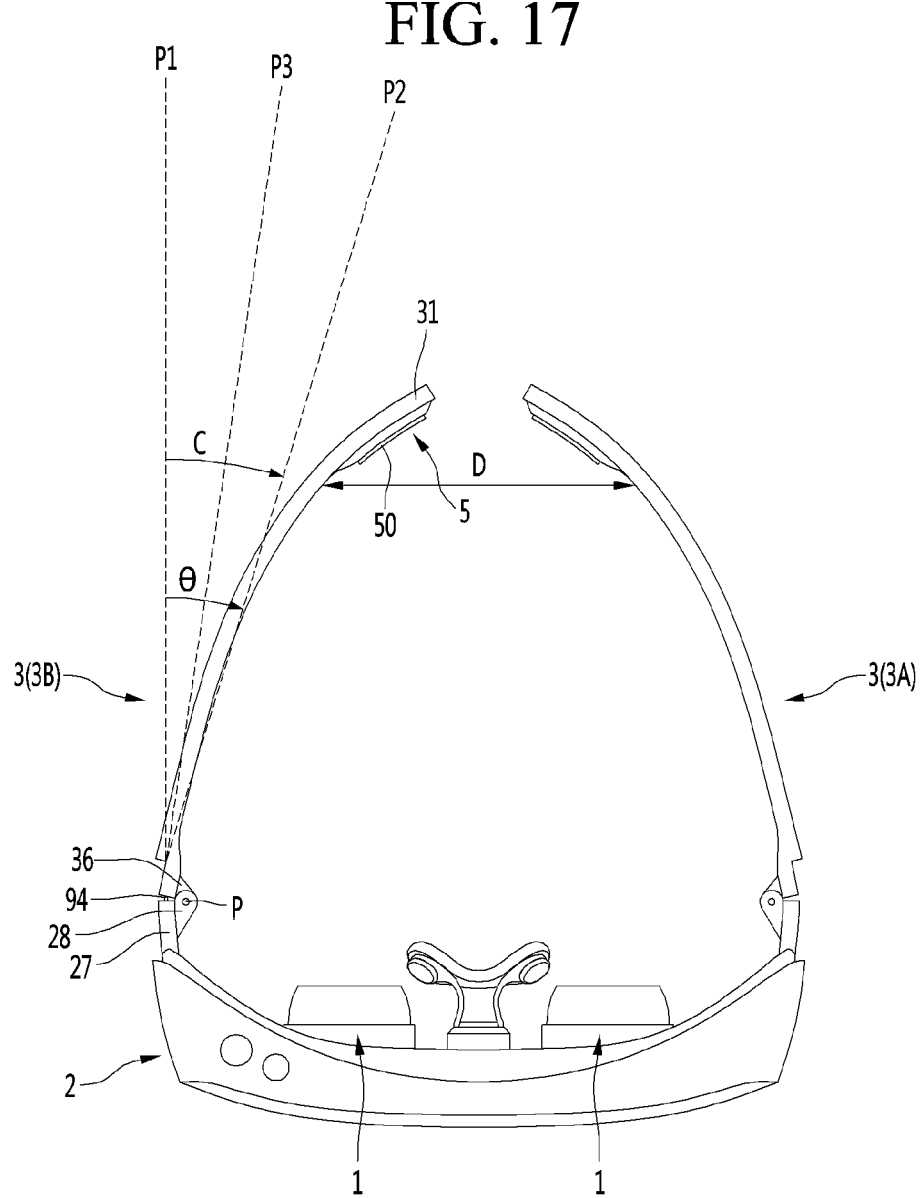
FIG. 17 is an enlarged cross-sectional view when the head-mounted display according to the sixth embodiment of the present invention is in a pressing mode.
Figure 18:
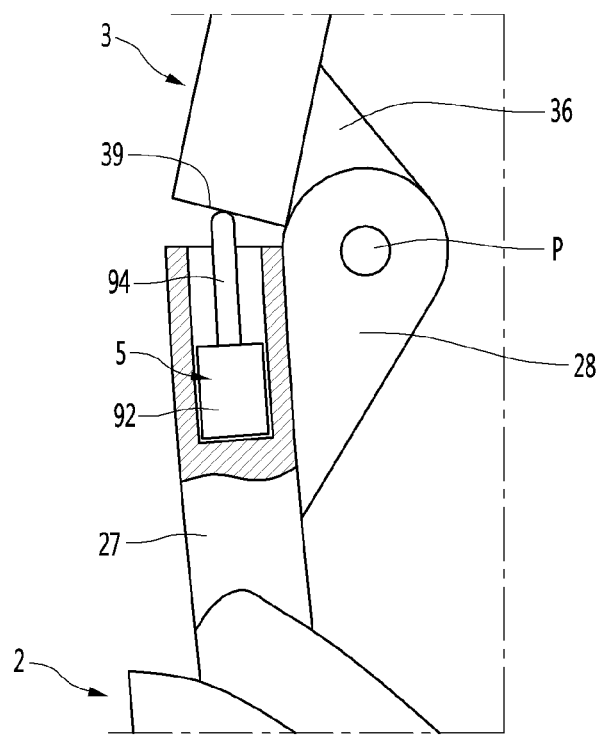
FIG. 18 is a partially enlarged plan view when the head-mounted display according to the sixth embodiment of the present invention is in a pressing mode.

FIG. 16 is a plan view when a head-mounted display according to a sixth embodiment of the present invention is in a normal mode, FIG. 17 is a plan view when the head-mounted display according to the sixth embodiment of the present invention is in a pressing mode, and FIG. 18 is a partially enlarged plan view when the head-mounted display according to the sixth embodiment of the present invention is in the pressing mode.

The load adjuster 5 of the present embodiment may include an actuator 92 which is installed in any one of the support leg 3 and the case 2 and is controlled by the controller 8, and the actuator 92 may have a push load 94 which moves to press the other of the support leg 3 and the case 4 and rotates the support leg 3 in the head direction C of the wearer.

As in the first embodiment of the present invention, the support leg 3 may be hinged to the case 4 and may be rotated about the hinge shaft P in the head direction C of the wearer or the opposite direction CW of the wearer's head.

That is, a hinge shaft support part rotatably supporting the hinge shaft P may be formed in any one of the case 2 and the support leg 3. A hinge shaft connector 36 connected to the hinge shaft P may be formed in the other of the case 2 and the support leg 3. The hinge shaft P may be rotated integrally with the hinge shaft connector 36. In addition, the actuator 92 may apply external force to the case 2 or the support leg 3 such that the support leg 3 is rotated about the hinge shaft P.

In the load adjuster 5 of the present embodiment, the actuator 92 may push the support leg 3 to change the angle θ of the support leg 3 as shown in FIGS. 16 and 17.

When the actuator 92 is installed in the case 2, the push load 94 may move from the actuator 92 to the support leg 3. The support leg 3 may include a contact end 39, with which the push load 94 may be brought into contact, in a region facing the actuator 92. The contact end 39 may be provided on the front end of the support leg 3.

As shown in FIG. 17, when the push load 94 retreats to press the contact end 39 of the support leg 3, the support leg 3 may be pushed by the push load 94 to be rotated about the hinge shaft P in the head direction C of the wearer and the pressing force applied from the support leg 3 to the wearer's head may be increased.

On the contrary, as shown in FIG. 16, when the push load 94 advances, the support leg 3 may be rotated in the opposite direction CW of the wearer's head without being disturbed by the push load 94, and the pressing force applied from the support leg 3 to the wearer's head H may be decreased.

On the contrary, when the actuator 92 is installed in the support leg 3, the push load 94 may move from the actuator 92 to the case 2. The case 2 may include a contact surface, with which the push load 94 may be brought into contact, in a region facing the actuator 92, and the contact surface may be provided on the rear surface of the case 2.

When the push load 94 advances to press the contact surface of the support leg 3, the support leg 3 may be rotated about the hinge shaft 9 by reaction of external force applied to the case 2 by the push load 94 in the head direction C of the wearer and the pressing force applied from the support leg 3 to the wearer's head H may be increased.

On the contrary, when the push load 94 retreats, the support leg 3 may be rotated in the opposite direction CW of the head direction C of the wearer without being disturbed by the push load 94, and the pressing force applied from the support leg 3 to the wearer's head H may be decreased.

The present embodiment is equal or similar to the fifth embodiment of the present invention except that the support leg 3 is connected to the case 2 through the hinge shaft P and the actuator 92 pushes and rotates the support leg 3, and a detailed description thereof will be omitted.

Figure 19:
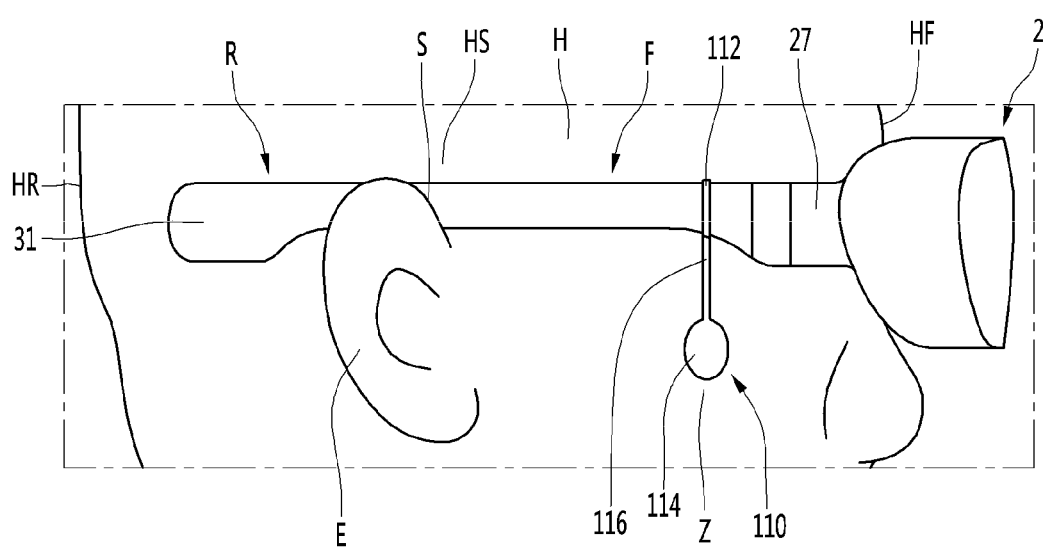
FIG. 19 is a side view showing a head-mounted display according to a seventh embodiment of the present invention.
Figure 20:
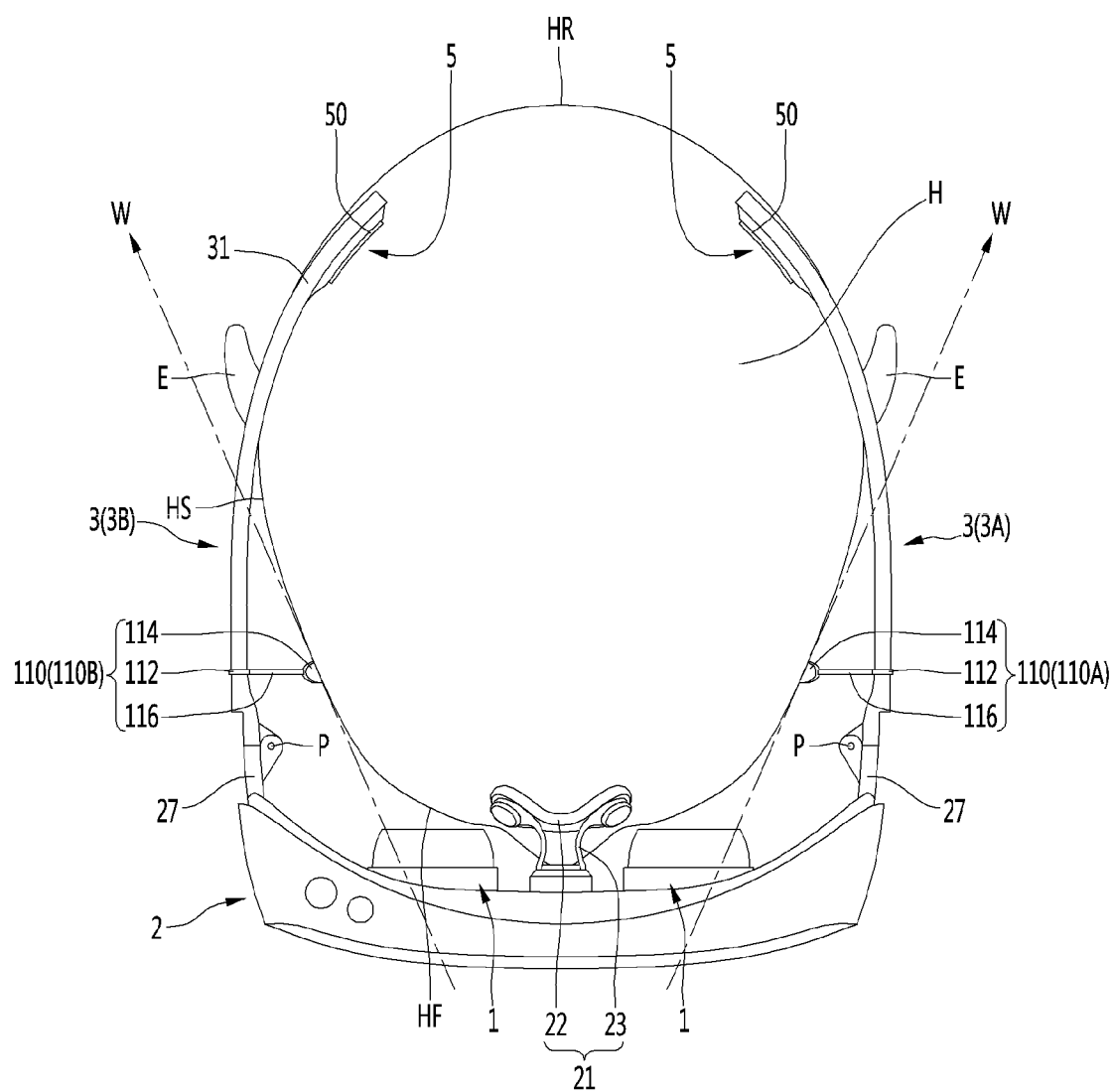
FIG. 20 is a plan view showing a head-mounted display according to the seventh embodiment of the present invention.

FIG. 19 is a side view showing a head-mounted display according to a seventh embodiment of the present invention, and FIG. 20 is a plan view showing a head-mounted display according to the seventh embodiment of the present invention.

The present embodiment may further include a nose pad 22 installed in the case 2 and seated on the nose N of the wearer and a pair of side pads 110 connected to the support leg 3. The present embodiment is equal or similar to any one of the first to sixth embodiments of the present invention except for the nose pad 22 and the pair of side pads 110 and a detailed description thereof will be omitted in order avoid a repeated description.

In the present embodiment, the pair of support legs 3 may be formed to softly surround the side and rear surfaces of the wearer's head. A curved part 31 surrounding the rear surface of the wearer's head may be formed in the pair of support legs 3.

In the present embodiment, the front load of the head-mounted display may be distributed to the nose pad 22 and the pair of side pads 110, more comfort may be provided to the wearer than the case where the front load of the display is concentrated on the nose pad 22, and the head-mounted display may be more stably supported.

The nose pad 22 may be directly connected to the case 2 and may be connected to the case 2 by a nose pad connector 23.

Each of the pair of side pads 110 may include a support leg connector 112 slidably connected to the support leg 3 in the longitudinal direction of the support leg 3, a seating pad 114, and a supporter 116 connecting the support leg connector 112 with the seating pad 114.

The pair of side pads 110 may include a left pad 110A connected to the left support leg 3A and a right pad 110B connected to the right support leg 3B. Hereinafter, the side pad 110 will be described with respect to the common configuration of the left pad 110A and the right pad 110B and the left pad 110A and the right pad 110B will be described with respect to different configurations of the left pad 110A and the right pad 110B.

The support leg connector 112 may be formed to surround the support leg 3 and to slide along the outer surface of the support leg 3 in the longitudinal direction of the support leg 3.

The wearer of the head-mounted display may have different face contours according to the size of the head, and the wearer may change the position of the support leg connector 112 in the forward-and-backward direction to bring the seating pad 114 into close contact with his/her face. Meanwhile, the wearer may seat the seating pad 114 at a most comfortable position while adjusting the position of the support leg connector 112 back and forth.

The seating pad 114 may be placed on a cheekbone portion of the wearer. Here, the cheekbone portion Z of the wearer may be a portion of the outer surface of the wearer's face corresponding to the cheekbone of the wearer. The seating pad 114 may be inclined in the tangential direction W of the outer surface of the cheekbone portion of the wearer. In the pair of side pads 110, the seating pad 114 may be inclined to increase an interval between the two seating pads 114 backward. That is, the seating pad of the left pad 110A and the seating pad of the right pad 110B may be inclined such that the interval therebetween is gradually increased backward.

The supporter 116 may be inclined from the support leg connector 112 to the cheekbone portion Z of the wearer. In the pair of side pads 110, the supporter 116 may be inclined such that an interval between two supporters 116 is decreased downward. That is, the supporter 116 of the left pad 110A may be inclined in a right lower inclination direction, the supporter 116 of the right pad 110B may be inclined in a left lower inclination direction, and the supporter 116 of the left pad 110A and the support 116 of the right pad 110B may be inclined such that the interval therebetween is gradually decreased downward.

In the present embodiment, as in the first embodiment, each of the pair of support legs may include the curved part 31 curved backward along the wearer's head and the curved part 31 may be formed to be curved along the head of the user at the rear side of the support leg 3.

In the present embodiment, since the support leg 3 surrounds the side and rear surfaces of the wearer's head and the side pads distributes the load concentrated on the nose pad 22, it is possible to improve wearing comfort of the head-mounted display.

In the present embodiment, when the curved part 31 presses the rear portion of the wearer's head H forward at the rear side of the wearer's head, the seating pad 114 may press the wearer's head H backward at the front side of the wearer's head and the head-mounted display may be more stably supported while the two curved parts 31 and the two seating pads 31 press the wearer's head at the front and rear sides of the wearer's head.

In the present embodiment, the head-mounted display may be stably supported on the wearer's head by the nose pad 22, the pair of side pads 110 and the pair of curved parts 31, and shaking of the screen of the display module 1 may be minimized even in a dynamic situation in which the wearer inclines his/her head.

Figure 21:
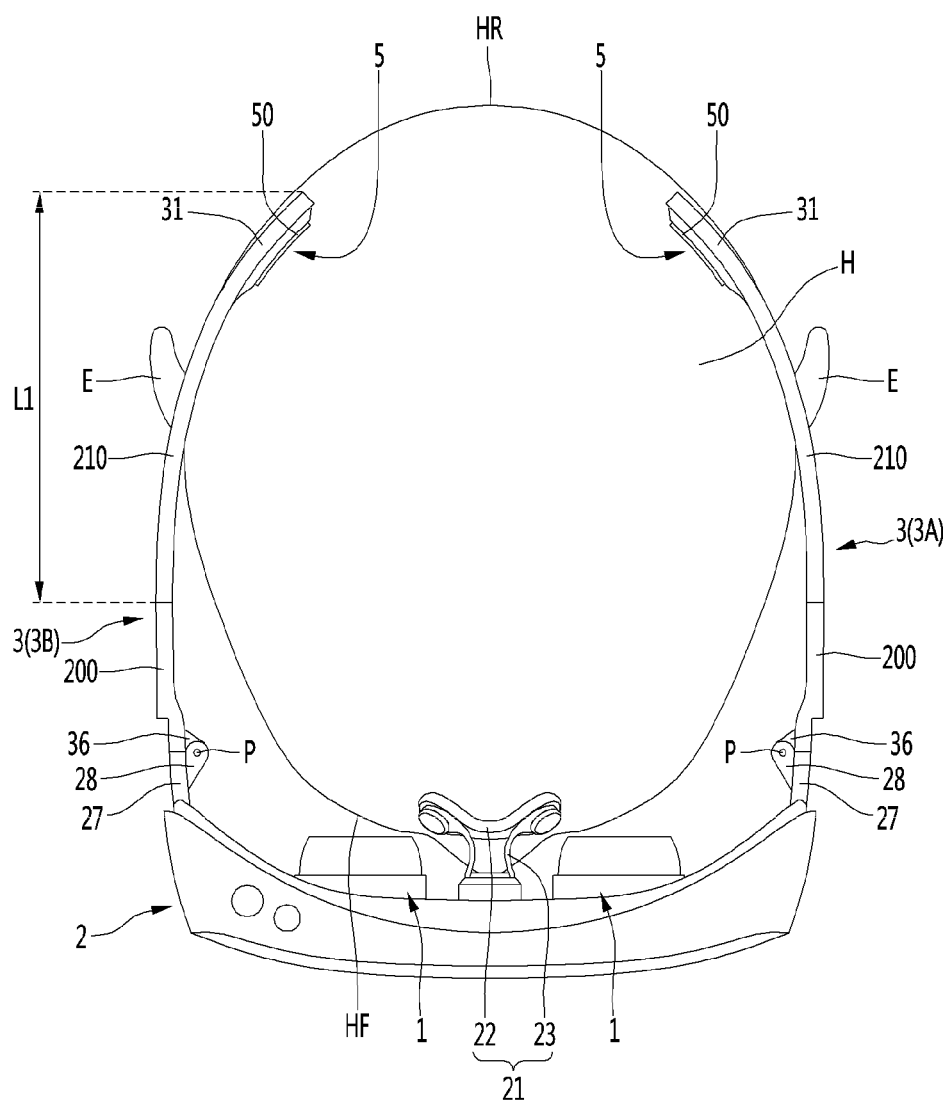
FIG. 21 is a plan view when the head-mounted display according to an eighth embodiment of the present invention is in a normal mode.
Figure 22:
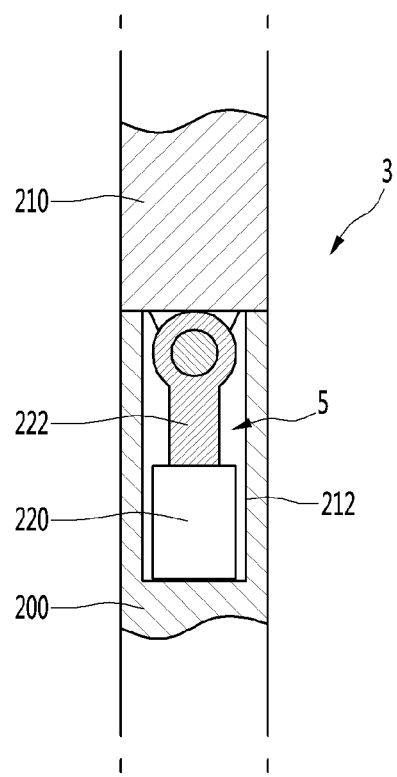
FIG. 22 is a partially enlarged plan view when the head-mounted display according to the eighth embodiment of the present invention is in a normal mode.
Figure 23:
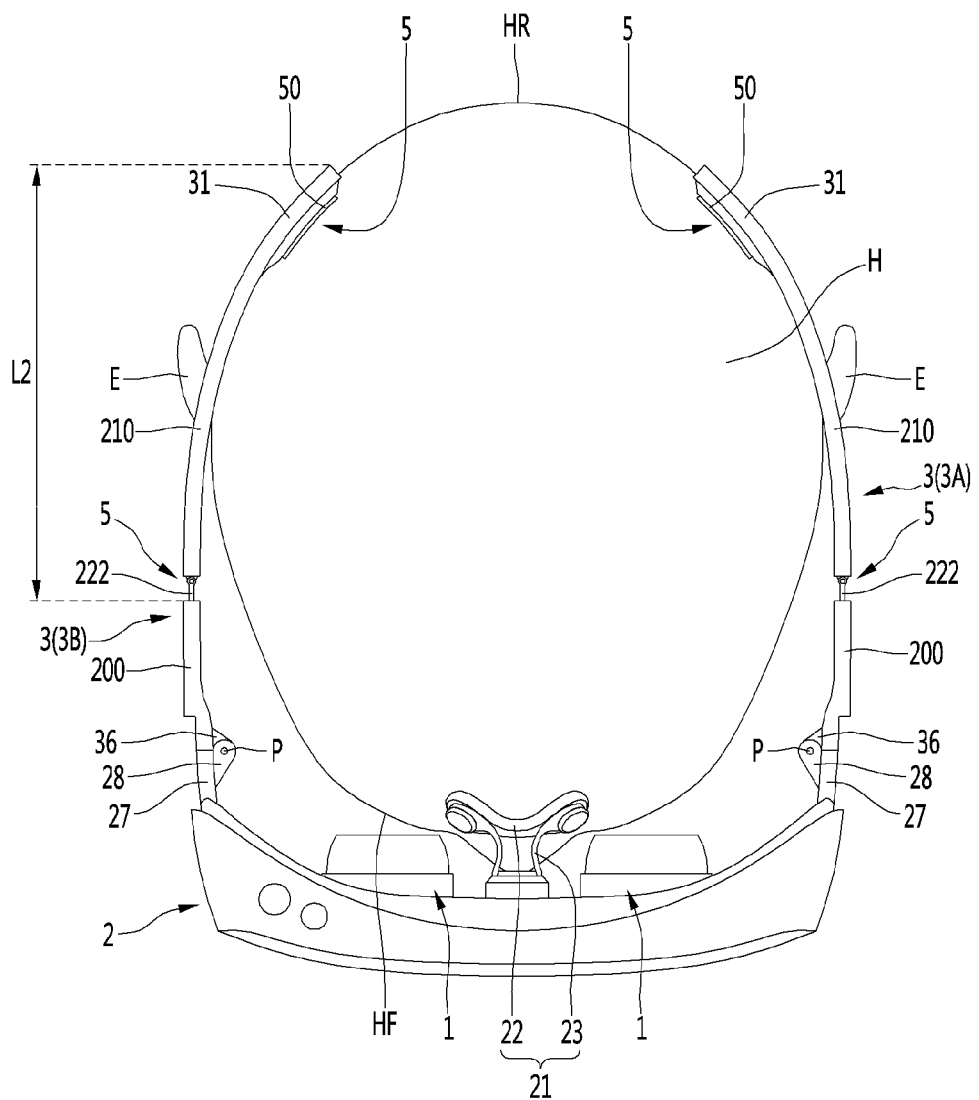
FIG. 23 is a plan view when the head-mounted display according to the eighth embodiment of the present invention is in a pressing mode.
Figure 24:
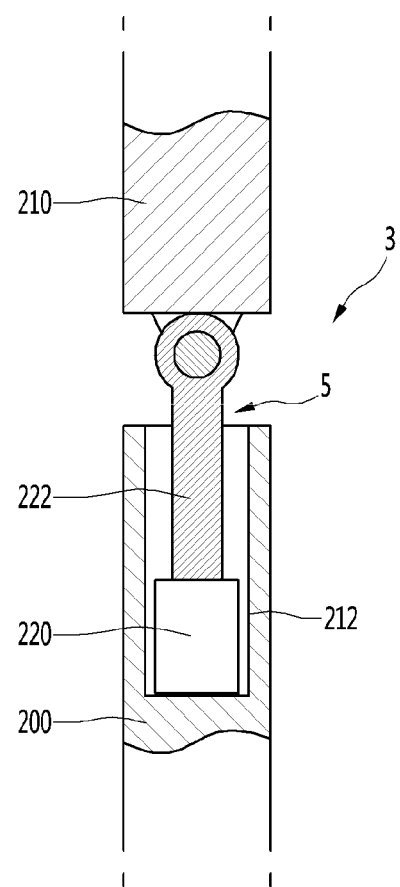
FIG. 24 is a partially enlarged plan view when the head-mounted display according to the eighth embodiment of the present invention is in a pressing mode.

FIG. 21 is a plan view when the head-mounted display according to an eighth embodiment of the present invention is in a normal mode, FIG. 22 is a partially enlarged plan view when the head-mounted display according to the eighth embodiment of the present invention is in a normal mode, FIG. 23 is a plan view when the head-mounted display according to the eighth embodiment of the present invention is in a pressing mode, and FIG. 24 is a partially enlarged plan view when the head-mounted display according to the eighth embodiment of the present invention is in a pressing mode.

The support leg 3 of the present embodiment may include a connection leg 200 connected to the case 2 and a moving leg 210 disposed on the connection leg 200 to be moved backward.

The load adjuster 5 may include an actuator 220 installed in any one of the connection leg 200 and the moving leg 210 and controlled by the controller 8 and a moving load 222 connected to the other of the connection leg 200 and the moving leg 210 and the actuator 220 to enable the moving leg 210 to advance or retreat upon driving the actuator 220.

The connection leg 200 may be hinged to the case 2 and may be rotated about the hinge shaft P.

The connection leg 200 may be connected to the case 2 to be rotated about the hinge shaft P. A hinge shaft support part 22 rotatably supporting the hinge shaft P may be formed in any one of the case 2 and the connection leg 3. A hinge shaft connector 36 connected to the hinge shaft P may be formed in the other of the case 2 and the connection leg 3. The hinge shaft P may be rotated integrally with the hinge shaft connector 36.

The moving leg 210 may be connected to the connection leg 210 to advance and retreat in the longitudinal direction of the support leg 3. The moving leg 210 may be connected to the connection leg 200 by the actuator 220 and the moving load 222.

The moving leg 210 may include a curved part 31 curved along the wearer's head backward.

When the actuator 220 is installed in the connection leg 200, the push load 222 may be connected to the moving leg 210 and, when the actuator 220 enables the push load 222 to retreat as shown in FIGS. 23 and 24, the push load 222 may enable the moving leg 210 to retreat to be moved away from the connection leg 220. In contrast, when the actuator 220 enables the push load 222 to advance as shown in FIGS. 21 and 22, the push load 222 may enable the moving body 210 to retreat to be moved close to the connection leg 200.

When the actuator 220 is installed in the connection leg 200, an actuator reception part 212 in which the actuator 220 may be received may be formed in the connection leg 200 in a groove shape in a region facing the moving leg 210.

When the actuator 220 is installed in the moving leg 210, the push load 222 may be connected to the connection leg 210 and, when the actuator 220 enables the push load 222 to advance, the push load 222 may push the connection leg 200 and the actuator 220 and the moving leg 210 may retreat by reaction of force applied to the connection leg 200 to be moved away from the connection leg 200. In contrast, when the actuator 220 enables the push load 222 to retreat, the actuator 220 and the moving body 210 may advance to be moved close to the connection leg 200.

When the actuator 220 is installed in the moving leg 210, an actuator reception part in which the actuator 220 may be received may be formed in the moving leg 210 in a groove shape in a region facing the connection leg 200.

When the moving leg 210 advances, a distance L1 between the rear end of the moving leg 210 and the rear end of the connection leg 200 may be small, the curved part 210 may become close to the wearer's head, and the pressing force applied from the curved part 31 to the wearer's head H may be increased.

When the moving leg 210 retreats, the distance L2 between the rear end of the moving leg 210 and the rear end of the connection leg 200 may be longer than that when the moving leg 210 advances, the curved part 31 may be moved away from the wearer's head, and the pressing force applied from the curved part 31 to the wearer's head H may be reduced or the curved part 31 may not press the wearer's head H.

The present embodiment may be equal or similar to the first to seventh embodiments of the present invention except for the division structure of the support leg 3 and advance and retreat of the moving leg 210 by the load adjuster 5, and the load adjuster 5 may further include the cushion 50 and the cushion advance/retreat mechanism 60 as in the first embodiment of the present invention.

The above description is only illustrative of the technical idea of the present invention. It will be apparent to those skilled in the art that various modifications and variations can be made in the present invention without departing from the spirit or essential characteristics thereof.

Therefore, the embodiments of the present invention are not intended to limit the scope of the present invention and the scope of the technical idea of the present invention is not limited by such embodiments.

The scope of the present invention should be construed by the following claims, and all technical ideas within the scope of equivalents thereof should be construed as being included in the scope of the present invention.

INDUSTRIAL APPLICABILITY

The present invention has industrial applicability in that it is possible to minimize shaking of a head-mounted display upon wearing the head-mounted display and to prevent the head-mounted display from being arbitrarily separated, thereby improving wearing comfort of the head-mounted display.

The invention claimed is:
1. A head-mounted display comprising:
a display module;
a case in which the display module is installed;
a pair of support legs connected to the case and supported on a wearer's head;
a motion sensor for sensing motion of the wearer's head;

a load adjuster for adjusting a load applied from each of the support legs to the wearer's head; and
a controller for controlling the load adjuster according to a sensed result of the motion sensor,
wherein the load adjuster includes:
a cushion installed in each of the support legs to face the wearer's head; and
a cushion advance/retreat mechanism controlled by the controller to enable the cushion to advance toward the wearer's head or to enable the cushion to retreat toward the support leg, and
wherein the cushion advance/retreat mechanism includes a motor installed in each of the support legs and having a motor shaft connected to the cushion.

2. The head-mounted display according to claim 1, wherein the motion sensor includes an acceleration sensor and a gyro sensor installed in any one of the display module, the case and the support legs.

3. The head-mounted display according to claim 1, wherein the motor is a linear motor for enabling the motor shaft to advance and retreat.

4. The head-mounted display according to claim 1, wherein the motor shaft is disposed orthogonally to a longitudinal direction of each of the support legs.

5. The head-mounted display according to claim 1, wherein each of the pair of the support legs includes a curved part curved backward along the wearer's head.

6. The head-mounted display according to claim 5, wherein the cushion is installed on the curved part.

7. The head-mounted display according to claim 1, further comprising:
a nose pad installed in the case and seated on a nose of the wearer; and
a pair of side pads connected to the support legs.

8. The head-mounted display according to claim 7, wherein each of the pair of side pads includes:
a support leg connector slidably connected to each of the support legs in a longitudinal direction of the support leg;
a seating pad; and
a supporter connecting the support leg connector with the seating pad.

9. The head-mounted display according to claim 8, wherein the supporter is inclined from the support leg connector to a cheekbone portion of the wearer.

10. The head-mounted display according to claim 8, wherein the seating pad is inclined in a tangential direction of an outer surface of a cheekbone portion of the wearer.

11. The head-mounted display according to claim 7, wherein each of the pair of support legs includes a curved part curved backward along the wearer's head.

12. A head-mounted display comprising:
a display module;
a case in which the display module is installed;
a pair of support legs connected to the case and supported on a wearer's head;
a motion sensor for sensing motion of the wearer's head;
a load adjuster for adjusting a load applied from each of the support legs to the wearer's head; and
a controller for controlling the load adjuster according to a sensed result of the motion sensor,
wherein the load adjuster includes:
a cushion installed in each of the support legs to face the wearer's head; and
a cushion advance/retreat mechanism controlled by the controller to enable the cushion to advance toward the wearer's head or to enable the cushion to retreat toward the support leg, and
wherein the cushion advance/retreat mechanism includes:
a motor installed in each of the support legs and having a motor shaft; and
a cushion contact member connected to the motor shaft and disposed to be brought into contact with the cushion.

13. The head-mounted display according to claim 12, wherein the cushion contact member includes a cam located between each of the support legs and the cushion.

14. A head-mounted display comprising:
a display module;
a case in which the display module is installed;
a pair of support legs connected to the case and supported on a wearer's head;
a motion sensor for sensing motion of the wearer's head;
a load adjuster for adjusting a load applied from each of the support legs to the wearer's head; and
a controller for controlling the load adjuster according to a sensed result of the motion sensor,
wherein each of the support legs includes:
a connection leg connected to the case; and
a moving leg disposed on the connection leg to be moved backward, and
wherein the load adjuster includes:
an actuator installed in any one of the connection leg and the moving leg and controlled by the controller; and
a moving load connected to the other of the connection leg and the moving leg and the actuator to enable the moving leg to advance and retreat upon driving the actuator.

15. The head-mounted display according to claim 14, wherein the moving leg includes a curved part curved backward along the wearer's head.

* * * * *